US011254120B2

(12) United States Patent
Kawai

(10) Patent No.: US 11,254,120 B2
(45) Date of Patent: Feb. 22, 2022

(54) CONVEYANCE DEVICE AND IMAGE INSPECTION DEVICE

(71) Applicant: RISO KAGAKU CORPORATION, Tokyo (JP)

(72) Inventor: Muneaki Kawai, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/552,303

(22) Filed: Aug. 27, 2019

(65) Prior Publication Data

US 2020/0070498 A1 Mar. 5, 2020

(30) Foreign Application Priority Data

Aug. 30, 2018 (JP) .............................. JP2018-161641
Aug. 20, 2019 (JP) .............................. JP2019-150485

(51) Int. Cl.
*B41F 33/00* (2006.01)
*G01N 21/892* (2006.01)

(52) U.S. Cl.
CPC ....... *B41F 33/0036* (2013.01); *G01N 21/892* (2013.01); *G06T 2207/30144* (2013.01)

(58) Field of Classification Search
CPC ...... B41F 33/0036; B41F 21/06; B41F 25/00; B41F 21/05; G01N 21/892; G01N 21/8903; G01N 21/89; G06T 2207/30144; G06T 7/0004; B65H 7/06; B65H 5/224; H04N 1/00018
See application file for complete search history.

(56) References Cited

U.S. PATENT DOCUMENTS 4,106,767 A * 8/1978 Schirrmeister ........ B65H 5/023
198/606
4,433,599 A * 2/1984 Mundus ................. B65H 5/224
83/112
5,634,636 A * 6/1997 Jackson ................ B65H 5/228
271/225

(Continued)

FOREIGN PATENT DOCUMENTS

JP 2006-033531 2/2006
JP 5437515 † 3/2014

(Continued)

OTHER PUBLICATIONS

Extended European Search Report for EP19194205.1 dated Apr. 15, 2020.

*Primary Examiner* — Michael Robert Cammarata
(74) *Attorney, Agent, or Firm* — Greenblum & Bernstein, P.L.C.

(57) ABSTRACT

A hanging prevention roller is installed between a first suction conveyance unit on an upstream side and a second suction conveyance unit. When an inspection object is sent from the first suction conveyance unit into the second suction conveyance unit, a top edge of the inspection object abuts on and runs on the hanging prevention roller before the top edge of the inspection objects hangs down under its own weight or due to downward curling and so forth, the top edge is sandwiched between the roller and the second suction conveyance unit, and thereby stable suction conveyance is started without delay.

16 Claims, 17 Drawing Sheets

(56) References Cited

U.S. PATENT DOCUMENTS

| | | | | |
|---|---|---|---|---|
| 2001/0046404 A1* | 11/2001 | Wotton | ................ | B41J 11/0085 |
| | | | | 400/578 |
| 2009/0057998 A1* | 3/2009 | Ong | .................... | B65H 11/007 |
| | | | | 271/276 |
| 2009/0145729 A1* | 6/2009 | Enomoto | ............... | B65H 5/224 |
| | | | | 198/807 |
| 2010/0117293 A1* | 5/2010 | Shinohara | .............. | B41J 11/007 |
| | | | | 271/264 |
| 2010/0225983 A1* | 9/2010 | Fujii | ...................... | H04N 1/123 |
| | | | | 358/498 |
| 2014/0265112 A1* | 9/2014 | Fujihara | ................... | B65H 7/16 |
| | | | | 271/276 |
| 2015/0191028 A1* | 7/2015 | Hara | ......................... | B41J 3/60 |
| | | | | 347/104 |
| 2016/0366296 A1* | 12/2016 | Isokawa | ............. | G03G 15/6529 |
| 2017/0253453 A1* | 9/2017 | La Vos | ..................... | B65H 5/36 |
| 2019/0312982 A1* | 10/2019 | Isokawa | ............. | H04N 1/00005 |
| 2019/0352105 A1* | 11/2019 | Piquer Perez | ......... | B65G 47/91 |
| 2020/0072759 A1* | 3/2020 | Kawai | ............... | H04N 1/00039 |

FOREIGN PATENT DOCUMENTS

| | | |
|---|---|---|
| JP | 2018-031963 | 3/2018 |
| WO | 2015/080136 | 6/2015 |

\* cited by examiner
† cited by third party

CONVEYANCE DEVICE AND IMAGE INSPECTION DEVICE

TECHNICAL FIELD

The present invention relates to an image inspection device which is able to inspect the images which are formed on both front and back surfaces of an inspection object with high accuracy while conveying the sheet-shaped inspection object in one direction by two conveyance units, and to a conveyance device which is preferably applicable to the image inspection device.

BACKGROUND ART

In an image forming apparatus which is equipped with a function of forming the images on both the front and back surfaces of a sheet, there are cases where it becomes necessary to inspect the images on both the front and back surfaces of the sheet while conveying the sheet. In such a case, it is possible to adopt such a configuration that one camera which captures the images formed on the sheet and one sensor are installed, an inverting section is installed on a path along which the sheet is conveyed, the image on the front surface is inspected by the sensor and thereafter the sheet is inverted so as to again pass under the sensor again and the image on the back surface of the sheet is inspected. However, a method of conveying and inverting the sheet by the inverting section in this way has such a problem that a mechanism is complicated and is increased in size.

An invention of an image forming apparatus is disclosed in Patent Literature 1. The image forming apparatus is equipped with a jam recovery device and is of the type that in a case where the top sheet which is jammed is located on the downstream side of a sheet inspection device 150, printing is resumed from images which are formed on the top jammed sheet on condition that an instruction to resume printing is issued from a user.

The image forming apparatus has a camera unit 230. Then, a sheet conveyance path 223 along which the sheet is conveyed in one direction from the upstream to the downstream is installed on the camera unit 230 and two cameras 231 and 232 are arranged at vertically aligned positions above and under the path 223 so as to face each other. That is, unlike the configuration that the images on both the front and back surfaces of one sheet are inspected by using one camera and the inverting section on the conveyance path, in the camera unit 230, the sheet is conveyed in one direction without being inverted and the two cameras 231 and 232 read out the respective images on upper and lower surfaces (the front and back surfaces) of the conveyed sheet respectively while the sheet is being conveyed. The sheet inspection device 150 inspects the images which are printed on the sheet by using captured images on the sheet which are sent from the camera unit 230.

Patent Literature 1: Japanese Unexamined Patent Application Publication No. 2018-31963

SUMMARY OF INVENTION

Technical Problem

In the camera unit of the image forming apparatus which is disclosed in Patent Literature 1, the two cameras are arranged at the vertically aligned positions with the sheet conveyance path being sandwiched between the two cameras so as to face each other and the camera unit is configured that images on vertically aligned places on both the front and back surfaces of the sheet are captured by the two cameras. Therefore, at positions on the sheet conveyance path where the cameras are installed, it is necessary to expose both the front and back surfaces of the sheet relative to the cameras across sufficiently wide areas. However, when large openings are formed in both upper and lower surfaces of a section of the sheet conveyance path where the cameras are arranged in order to bring both the front and back surfaces of the conveyed sheet into largely exposed states, guidance and holding of the sheet which is conveyed are not sufficiently conducted and the position of the sheet fluctuates while the sheet is being conveyed. Therefore, there is a problem of the possibility that an image capturing accuracy by the camera may be lowered.

The inventors and others of the present application have found the problem of such related art and a problem thereof and then continued studies earnestly in order to solve this problem. As a result, they have found an idea about an unpreceded and novel image inspection device which is able to stably convey the inspection object in one direction and is able to inspect images on both front and back surfaces of the inspection object with necessary accuracy with no need of using a complicated mechanism which inverts the sheet-shaped inspection object.

The image inspection device includes a first upstream-side conveyance unit which is arranged in a state of directing a conveyance surface on which the sheet-shaped inspection object is conveyed to the upper surface side, a second conveyance unit which is arranged adjacent to the conveyance surface of the first conveyance unit in a state of directing a conveyance surface on which the sheet-shaped inspection object is conveyed to the lower surface side, a first inspection section which inspects an image on a front surface of the inspection object which is conveyed to the first conveyance unit, and a second inspection section which inspects an image on a back surface of the inspection object which is conveyed to the second conveyance unit.

However, the inventors and others of the present application have found another problem to be solved in the image inspection device as a result of advancing the studies on the image inspection device. That is, they have found the problem that in this image inspection device, there are cases where the top edge of the inspection object hangs down when delivering the inspection device from the upstream-side first conveyance unit to the downstream-side second conveyance unit, and the device fails to deliver the inspection object to the downstream side second conveyance unit.

The present invention has been made by further improving the invention of the image forming apparatus that the inventors and others of the present application have made in order to solve another problem of the related art and aims to surly deliver the inspection object between the two conveyance units in the image inspection device which is able to inspect the images which are formed on both the front and rear surfaces of the inspection object with high accuracy by the two inspection sections while conveying the sheet-shaped inspection object in one direction by the two conveyance units. In addition, the present invention also aims to surly deliver the inspection object between the two conveyance units in a conveyance device which conveys the sheet-shaped inspection object in one direction by the two conveyance units.

Solution to Problem

A conveyance device according to a first aspect of the present invention includes:

a first conveyance unit which is arranged in such a manner that a conveyance surface on which a sheet-shaped conveyance (inspection) object is conveyed is located on an upper surface side;

a second conveyance unit which is arranged adjacent to the conveyance surface of the first conveyance unit along a conveyance object conveyance direction in such a manner that a conveyance surface on which the sheet-shaped conveyance object is conveyed is located on the lower surface side; and a hanging prevention member which is installed between the first conveyance unit and the second conveyance unit and delivers the conveyance object from an upstream side to a downstream side of the conveyance direction in such a manner that a top edge of the conveyance object does not hang down.

An image inspection device according to a second aspect of the present invention includes:

a first conveyance unit which is arranged in such a manner that a conveyance surface on which a sheet-shaped inspection object is conveyed is located on the upper surface side;

a second conveyance unit which is arranged adjacent to the conveyance surface of the first conveyance unit along an inspection object conveyance direction in such a manner that a conveyance surface on which the sheet-shaped inspection object is conveyed is located on the lower surface side;

a first inspection section which inspects an image on a front surface of the inspection object which is conveyed to the first conveyance unit; and a second inspection section which inspects an image on a back surface of the inspection object which is conveyed to the second conveyance unit, wherein a hanging prevention member which delivers the inspection object from the upstream side to the downstream side of the conveyance direction in such a manner that a top edge of the inspection object does not hang down is installed between the first conveyance unit and the second conveyance unit.

Advantageous Effects of Invention

According to the conveyance device according to the first aspect of the present invention, the conveyance object is stably conveyed by being held on the upper surface side of the first conveyance unit, for example, by suction and bonding. The conveyance object is delivered from the upstream side to the downstream side by the hanging prevention member between a downstream-side end of the first conveyance unit and an upstream-side end of the second conveyance unit, and the top edge of the conveyance object does not hang down. Therefore, the top edge of the conveyance object is surely held on the conveyance surface of the second conveyance unit and is stably conveyed as it is toward the downstream. The conveyance object is continuously conveyed from the first conveyance unit to the second conveyance unit stably in this way.

According to the image inspection device according to the second aspect of the present invention, the inspection object is stably conveyed by being held on the upper surface side of the first conveyance unit, for example, by suction and bonding. The inspection object is delivered from the upstream side to the downstream side by the hanging prevention member between the downstream-side end of the first conveyance unit and the upstream-side end of the second conveyance unit, and the top edge of the inspection object does not hang down. Therefore, the top edge of the inspection object is surely held on the conveyance surface of the second conveyance unit and is continuously conveyed as it is toward the downstream stably. Since the inspection object is continuously conveyed from the first conveyance unit to the second conveyance unit stably in this way, expected accuracies are maintained in inspection by the first inspection section and the second inspection section.

DESCRIPTION OF EMBODIMENTS

<<Basic Structure and Configuration of Image Forming System>>

One embodiment of the present invention will be described with reference to FIG. 1 to FIG. 12.

Figure 1:
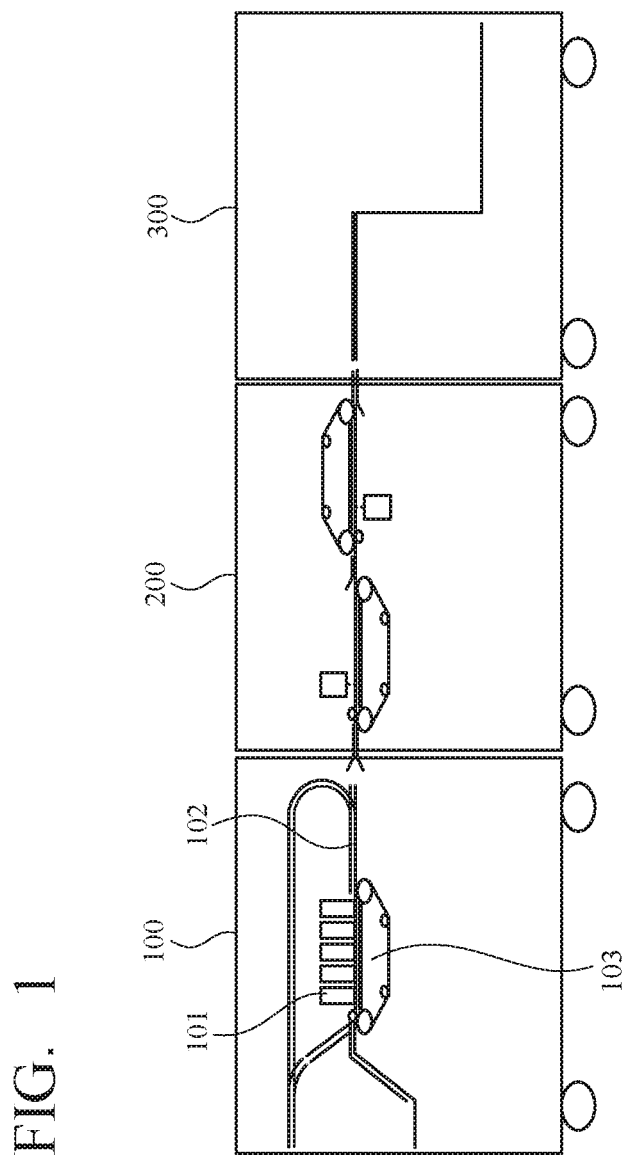
FIG. 1 is an overall configuration diagram illustrating one example of an image forming system which includes an image inspection device according to one embodiment of the present invention.

As schematically illustrated in FIG. 1 by simplifying the structure, one embodiment of the present invention relates to an image forming system which includes a printing device 100, an image inspection device 200 and a post-processing device 300 and particularly has characteristics in the structure of the image inspection device 200 as will be described later.

The printing device 100 has a plurality of inkjet heads 101 which are different from one another in ink color, a conveyance path 102 along which a sheet-shaped medium (a printing sheet) which is an inspection object of the image inspection device 200 is conveyed, and a suction conveyance unit 103 which is installed directly under the inkjet heads 101 in a state of being connected with the conveyance path 102. Illustration of other configurations such as a printing sheet feeding element and so forth is omitted. The post-processing device 300 is a device which performs various post-processing operations on the printing sheet on which images are printed by the printing device 100 and the images so printed are inspected by the image inspection device 200 and then discharges the printing sheet. As contents of the post-processing, sorting work such as sorting, stacking and so forth, stapling, paper insertion, paper folding of various forms, insertion of the paper into an envelope and so forth are included, and it is possible to install the post-processing device 300 which is equipped with necessary functions in accordance with a purpose.

<<Basic Structure and Configuration of Image Inspection Device>>

First, a basic configuration of the image inspection device 200 will be described with reference to FIG. 2 and FIG. 3.

The image inspection device 200 has two suction conveyance units (a first suction conveyance unit 1 and a second suction conveyance unit 2) as elements for conveying a sheet-shaped inspection object (a sheet-shaped medium, that is, the printing paper). First, the first suction conveyance unit 1 will be briefly described within a range which is illustrated in FIG. 2. The first suction conveyance unit 1 has a belt conveyor that a conveyor belt 6 is wound around an upstream-side drive roller 3, an upstream-side driven roller 4, and other two small driven rollers 5. As will be illustrated later in other drawings (for example, see FIG. 5), a resinous intermediate plate 7 is in contact with a lower surface of the upper-side conveyor belt 6 of the first suction conveyance unit 1 and a platen 8 which is a plate material is in contact with a lower surface of the intermediate plate 7. Many through-holes are formed in the conveyor belt 6, the intermediate plate 7, and the platen 8 respectively. Further, a chamber (not illustrated) is attached to a lower surface of the platen 8 and air is sucked by a fan (not illustrated) which is attached to a lower part of the chamber so as to maintain a negative pressure in the chamber. Accordingly, when the fan is driven, the air is sucked into the chamber from the Lop of the conveyor belt 6 into the chamber through the respective through-holes in the conveyor belt 6, the intermediate plate 7, and the platen 8 and thereby the inspection object is sucked onto the conveyance surface of the conveyor belt 6. Then, when the conveyor belt 6 is driven, it becomes possible to convey the inspection object.

Incidentally, the aforementioned upstream side and downstream side are used in the sense of the upstream side and the downstream side of a direction that the inspection object is conveyed by the suction conveyance units 1 and 2, and the same also applies to the following description.

In the first and second suction conveyance units 1 and 2 of the image inspection device 200, a sheet which is a sheet-shaped medium such as printing paper and so forth is conveyed as an object to be conveyed. Unlike a bag and so forth having a structure that two sheets are stacked, the sheet is sucked to the conveyor belt 6 across the entire surface, a position of the sheet which is vertical to the conveyor belt 6 is fixed within the conveyance surface, and the sheet is conveyed with movement of the conveyor belt 6 in a stable state. Therefore, a height-wise position of the sheet which is conveyed does not fluctuate and a position accuracy of the sheet is high. Accordingly, in a case where a CIS (Contact Image Sensor) and so forth which are shallower than a camera and so forth in depth of field and for which a high arrangement accuracy is required for obtaining an expected reading accuracy is adopted as an element for inspecting the sheet which is conveyed by the first and second suction conveyance units 1 and 2 are adopted, it becomes possible to sufficiently exhibit the high reading accuracy that the CIS originally has. The camera and CIS will be described later.

Figure 2:
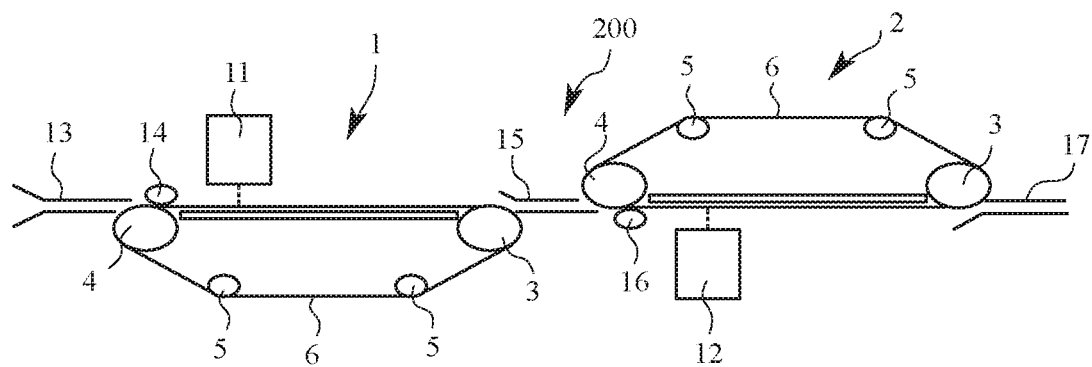
FIG. 2 is a schematic configuration diagram illustrating one example of the image inspection device according to the embodiment of the present invention.
Figure 3:
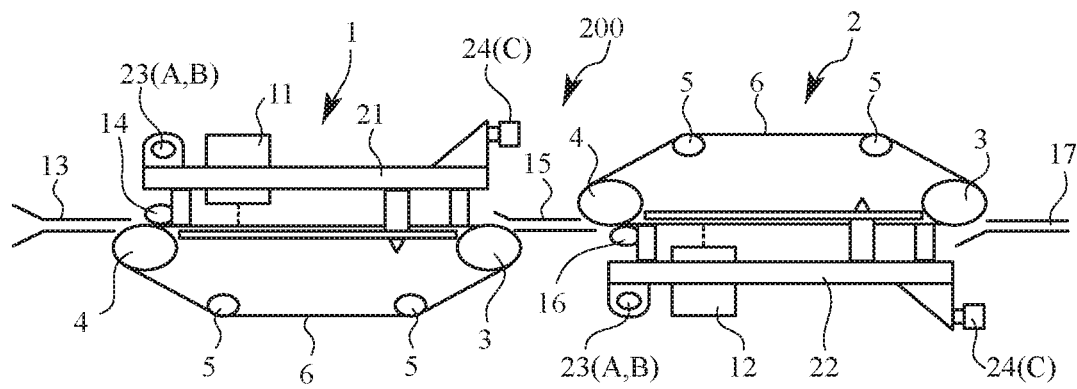
FIG. 3 is a schematic configuration diagram illustrating one example of the image inspection device which is illustrated by further adding support sections for inspection sections to the schematic configuration diagram in FIG. 2.

As illustrated in FIG. 2, in an inspection object conveyance direction which directs from left to right in the drawing, the conveyance unit which is located on the upstream side is the first suction conveyance unit 1 and the conveyance unit which is located on the downstream side is the second suction conveyance unit 2. Although the first suction conveyance unit 1 and the second suction conveyance unit 2 have the same functional configuration, the first suction conveyance unit 1 is arranged horizontally in such a manner that the conveyance surface onto which the inspection object is sucked and conveyed is located on the upper surface side. Accordingly, the inspection object which is conveyed by the first suction conveyance unit 1 is conveyed with its front surface facing upward. On the other hand, the second suction conveyance unit 2 is arranged in a state of being turned upside down relative to the first suction conveyance unit 1, That is, the second suction conveyance unit 2 is horizontally arranged in such a manner that the conveyance surface onto which the inspection object is sucked and conveyed is located on the lower surface side. Accordingly, the inspection object which is conveyed by the second suction conveyance unit 2 is conveyed with its back surface facing downward. The first suction conveyance unit 1 and the second suction conveyance unit 2 are arranged adjacent to each other in such a manner that the respective conveyance surfaces almost match each other and are able to continuously convey the inspection object along one horizontal conveyance path.

As illustrated in FIG. 2, the image inspection device 200 has two inspection sections (a first inspection section 11 and a second inspection section 12) as elements for inspecting images on the inspection object. The first inspection section 11 is installed above an upstream-side end of the first suction conveyance unit 1 in a state of being directed downward so as to face the conveyor belt 6. The second inspection section 12 is installed under an upstream-side end of the second suction conveyance unit 2 in a state of being directed upward so as to face the conveyor belt 6. The first inspection section 11 and the second inspection section 12 are configured by the CISs (Contact Image Sensor) which are the same as each other in specification. However, sensors which are based on other principles or have other structures and configurations are not limited to the CISs as the inspection sections which read out images which are formed on the inspection object for inspection, and cameras may also be used as will be described later.

As illustrated in FIG. 2, the image inspection device 200 includes an introduction guide plate 13 which is adjacent to the upstream-side end of the first suction conveyance unit 1 and guides the inspection object which is sent from the upstream-side printing device 100 to the conveyance surface. In addition, a press roller 14 which presses floating of a top edge of the inspection object which is introduced by being guided by the introduction guide plate 13 is installed above the driven roller 4 of the first suction conveyance unit 1. The press roller 14 rotates following the conveyor belt 6.

As illustrated in FIG. 2, the image inspection device 200 includes an intermediate guide plate 15 which is installed between the first suction conveyance unit 1 and the second suction conveyance unit 2 and guides the inspection object sent from the first suction conveyance unit 1 to the conveyance surface of the second suction conveyance unit 2. In addition, a hanging prevention roller 16 is installed under the driven roller 4 of the second suction conveyance unit 2 as a hanging prevention member which prevents the top edge of the inspection object which is introduced by being guided by the intermediate guide plate 15 from hanging as will be described later with reference to other drawings (see, for example, FIG. 6 and FIG. 8).

As illustrated in FIG. 2, the image inspection device 200 includes a discharge guide plate 17 which is adjacent to a downstream-side end of the second suction conveyance unit 2 and discharges the inspection object which is conveyed by the second suction conveyance unit 2.

Next, a basic configuration of the image inspection device 200 which is not illustrated in FIG. 2 will be described with reference to FIG. 3. The aforementioned first inspection section 11 and second inspection section 12 are respectively attached to a first support section 21 and a second support section 22 which are positioned relative to the first suction conveyance unit 1 and the second suction conveyance unit 2 respectively. Although the first support section 21 and the second support section 22 have substantially the same functional configuration, the first support section 21 and the second support section 22 are arranged in a state of being mutually turned upside down so as to face the respective conveyance surfaces of the first suction conveyance unit 1 and the second suction conveyance unit 2 which are arranged in a state of being mutually turned upside down. In addition, as will be described later with reference to other drawings (see, for example, FIG. 5 and so forth), the first support section 21 and the second support section 22 are supported to a frame (not illustrated) of the image inspection device 200 to be rotationally movable around support points A and B respectively at both ends of a long support shaft 23. In FIG. 3, a central axis of the long support shaft 23 is vertical to a surface of paper and the first support section 21 and the second support section 22 are supported to the frame in a state of being rotationally movable in both left and right directions around this central axis (described later with reference to arrows indicated in FIG. 5). In addition, the first support section 21 and the second support section 22 are supported to the frame (not illustrated) of the image inspection device 200 to be rotationally movable around a support point C by a short support shaft 24 respectively. In FIG. 3, a central axis of the short support shaft 24 is parallel with the surface of paper and almost horizontal and the first support section 21 and the second support section 22 are supported to the frame in a state of being rotationally movable around the central axis of the short support shaft 24 in both paper surface forward direction and paper surface rearward direction (described later with reference to the arrows indicated in FIG. 5). Although details will be described later, supported states of the first support section 21 and the second support section 22 at the support points A, B and C are not fixed and the image inspection device 200 is configured that even in a case where the frame is deformed by addition of external force, the first support section 21 and the second support section 22 are not deformed and no harmful change occurs in an arrangement relation of the both because the first support section 21 and the second support section 22 are made rotationally movable in the abovementioned two directions.

According to the image inspection device 200 in the embodiment having the above-described basic configuration, the inspection object is stably conveyed in a state of being sucked and held on the conveyance surface which is located on the upper surface side of the first suction conveyance unit 1 and then is delivered to the second suction conveyance unit 2 and is stably conveyed in a state of being sucked and held on the conveyance surface which is located on the lower surface side of the second suction conveyance unit 2. Since the inspection object is conveyed in a sucked state in this way, the position and the posture of the inspection object do not become unstable while the inspection object is being conveyed and thereby it becomes possible to inspect the images on both the front and back surfaces of the inspection object with necessary accuracy by the two inspection sections 11 and 12 while stably conveying the inspection object in one direction without using a complicated mechanism which inverts the inspection object.

In addition, according to the image inspection device 200, since the respective inspection sections 11 and 12 are arranged in the vicinity of the upstream-side ends of the respective suction conveyance units 1 and 2, most parts of the conveyance surfaces of the respective suction conveyance units 1 and 2 are in open states and there is no obstacle on the conveyance surfaces. Therefore, a manager who manages the image inspection device 200 or a worker who performs maintenance and so forth of the image inspection device 200 is able to access to the conveyance surfaces of the respective suction conveyance units 1 and 2 with ease. Accordingly, since the conveyance path 102 of the inspection object is not sandwiched between the inspection sections unlike the camera unit of the image forming apparatus which is disclosed in Patent Literature 1 which is described in {Background Art}, even when a jam occurs in the inspection object which is being conveyed, the manager or the worker is able to remove the jammed inspection object by inserting his/her hand into a trouble-occurred place with ease.

In addition, according to the image inspection device 200, since the respective inspection sections 11 and 12 are arranged in the vicinity of the upstream-side ends of the respective suction conveyance units 1 and 2, in a case where results of image detection by the inspection sections 11 and 12 are utilized on the downstream side, it is preferable to arrange the inspection sections in the vicinity of the upstream side ends of the suction conveyance units because sufficient time is secured. For example, in a case where an inspection object which is decided to be unfavorable in inspection result is sorted as a defective product in the post-processing device 300 which is located at the rear stage of the image inspection device 200, it is desirable to obtain information from the inspection sections 11 and 12 as soon as possible for decision of whether the inspection object is the defective product. According to the image inspection device 200 of the present embodiment, since the inspection sections 11 and 12 are installed on the upstream sides of the first and second suction conveyance units 1 and 2 respectively, it becomes possible for a control unit to obtain the inspection results earlier than a case where the inspection sections are installed on the downstream sides and to execute the necessary post-processing without delay.

<<Details of Structure of Image Inspection Device>>

Next, a concrete structure of the image inspection device 200 which has the above-described basic structure described with reference to FIG. 4 to FIG. 12. First, the first support section 21 and the second support section 22 to which the first inspection section 11 and the second inspection section 12 are attached respectively and a structure and so forth that the respective first and second support sections 21 and 22 are positioned relative to the first and second suction conveyance units 1 and 2 respectively will be described with reference to FIG. 4 to FIG. 9.

Figure 5:
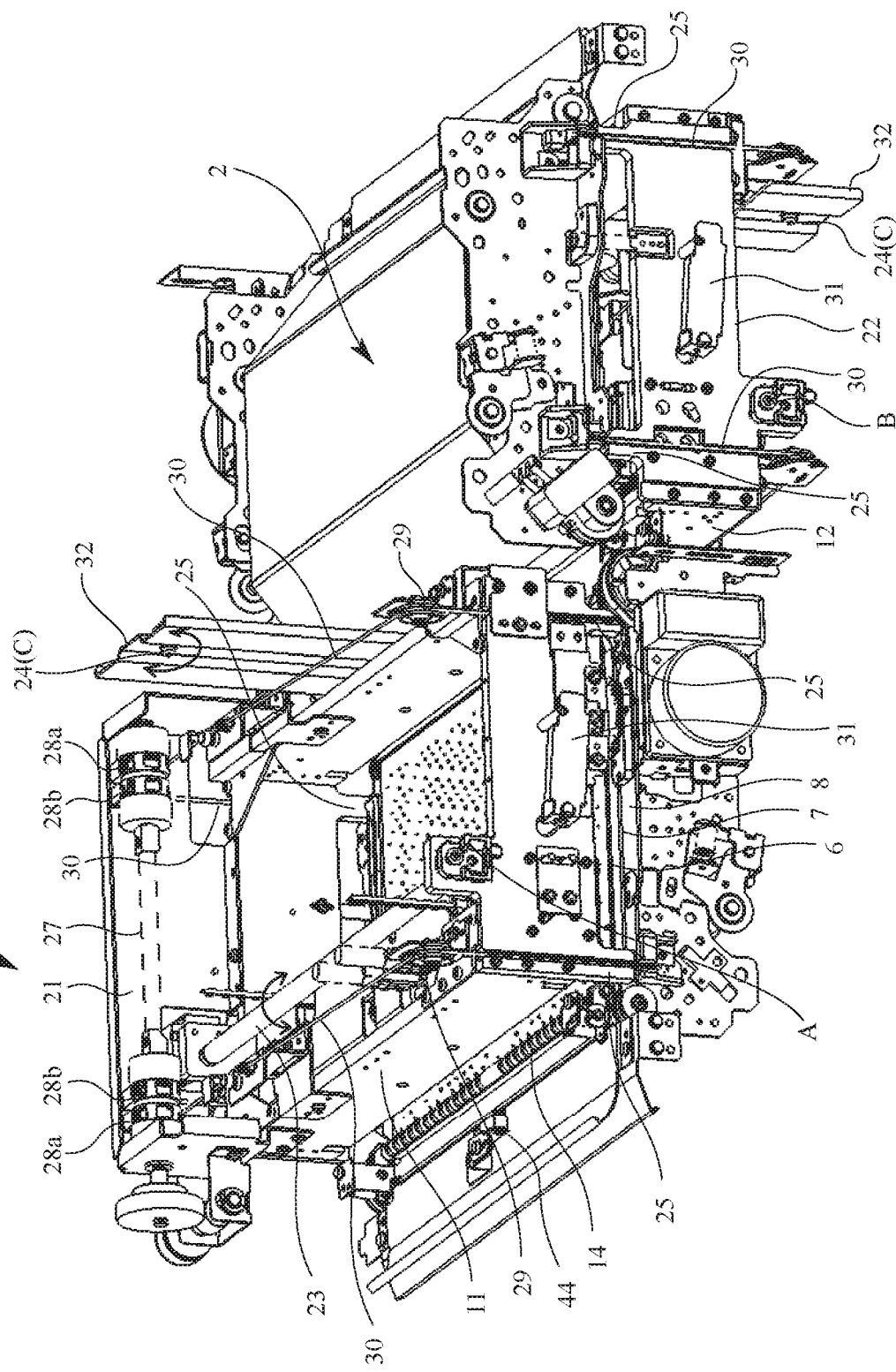
FIG. 5 is a perspective view illustrating one example of the image inspection device according to the embodiment when seen diagonally from above.
Figure 9:
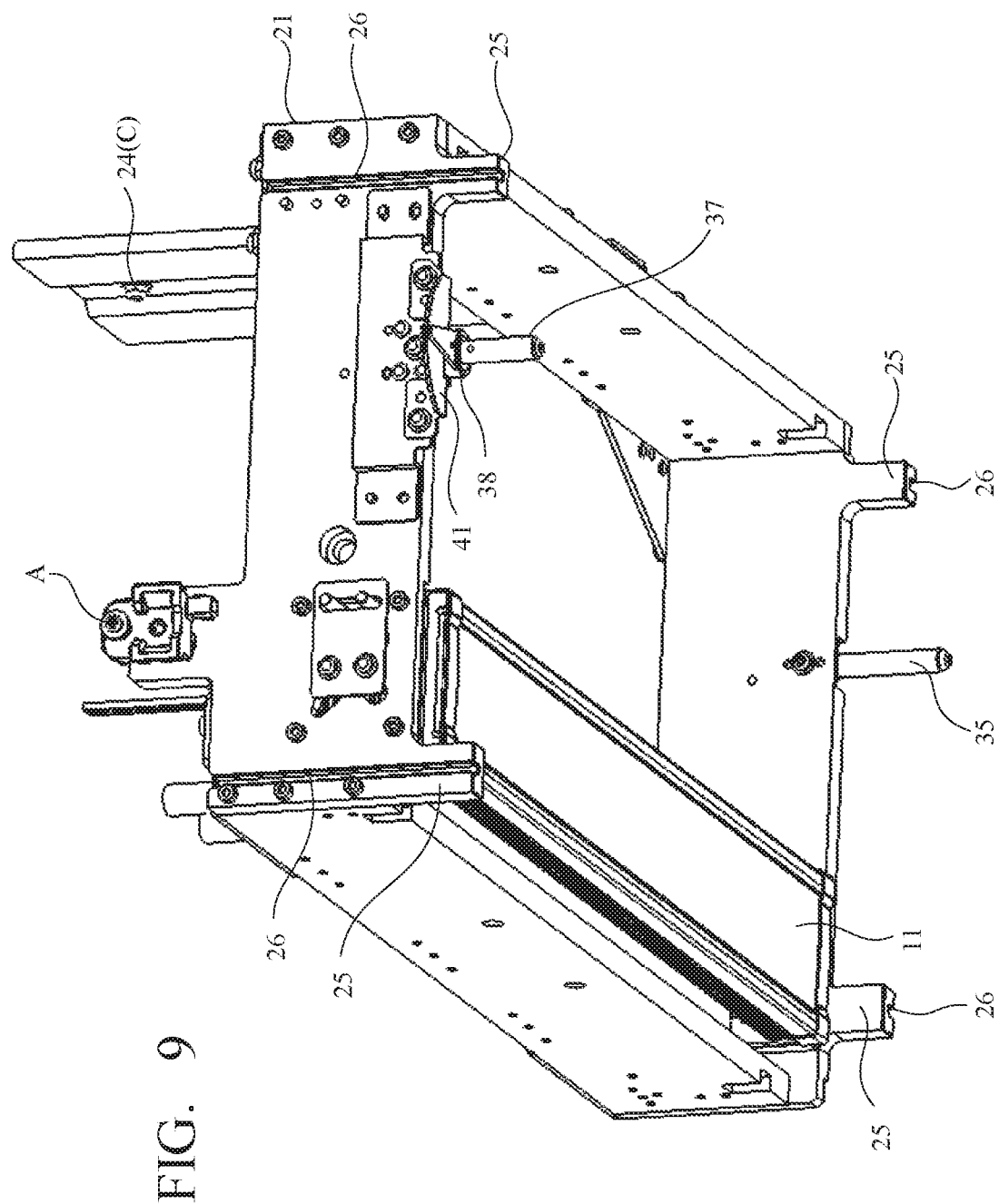
FIG. 9 is a perspective view illustrating one example of upstream side holding section and inspection section of the image inspection device according to the embodiment of the present invention when seen diagonally from below.

As illustrated particularly in FIG. 5 and FIG. 9, the first support section 21 is a frame body having an almost square outer shape which almost matches a planar shape of the first suction conveyance unit 1. In four walls of the first support section 21, the first inspection section 11 which sets a direction (a width direction of the inspection object) orthogonal to the inspection object conveyance direction as a longitudinal direction is attached to the inner side of an upstream-side wall which is orthogonal to the inspection object conveyance direction. An inspection element of the first inspection section 11 is directed to a direction of the conveyor belt 6.

As illustrated particularly in FIG. 9, support legs 25 which are set to predetermined dimensions are formed on four corners of the first support section 21 so as to project toward the side which faces the first suction conveyance unit 1. A groove 26 is vertically formed in each support leg 25. As illustrated particularly in FIG. 4 and FIG. 5, the four support legs 25 of the first support section 21 abut on the upper surface of the platen B which protrudes from the intermediate plate 7 of the first suction conveyance unit 1 at every two positions (four positions in total) with the conveyor belt 6 being sandwiched therebetween. Then, the first support section 21 holds the first suction conveyance unit 1 by pressing the first suction conveyance unit 1 against the support legs 25 and thereby maintains a distance between the first inspection section 11 and the conveyance surface of the first suction conveyance unit 1 constant as will be described in the following and as indicated by a distance D particularly in FIG. 4.

Figure 4:
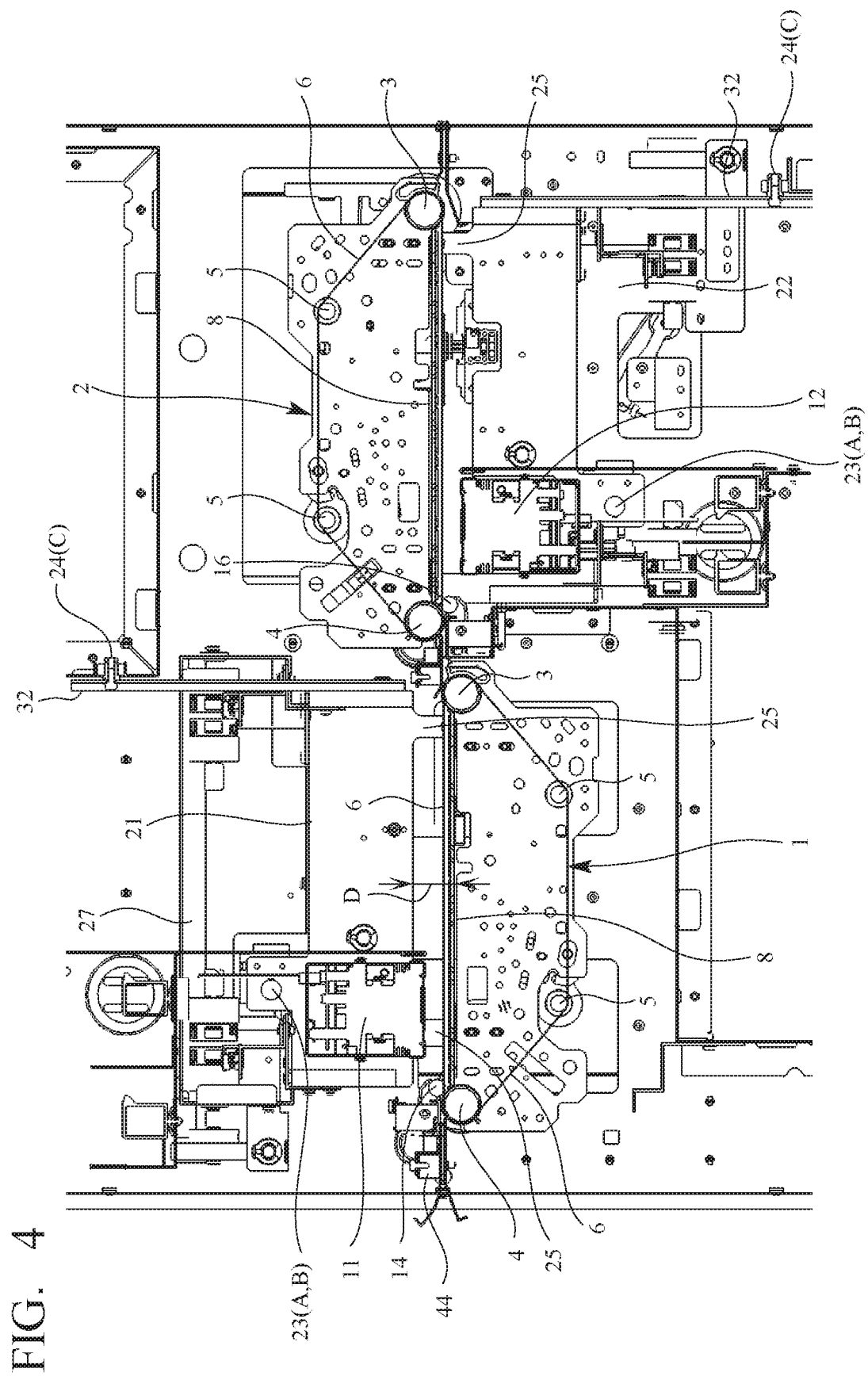
FIG. 4 is a front view illustrating one example of the image inspection device according to the embodiment of the present invention.
Figure 7:
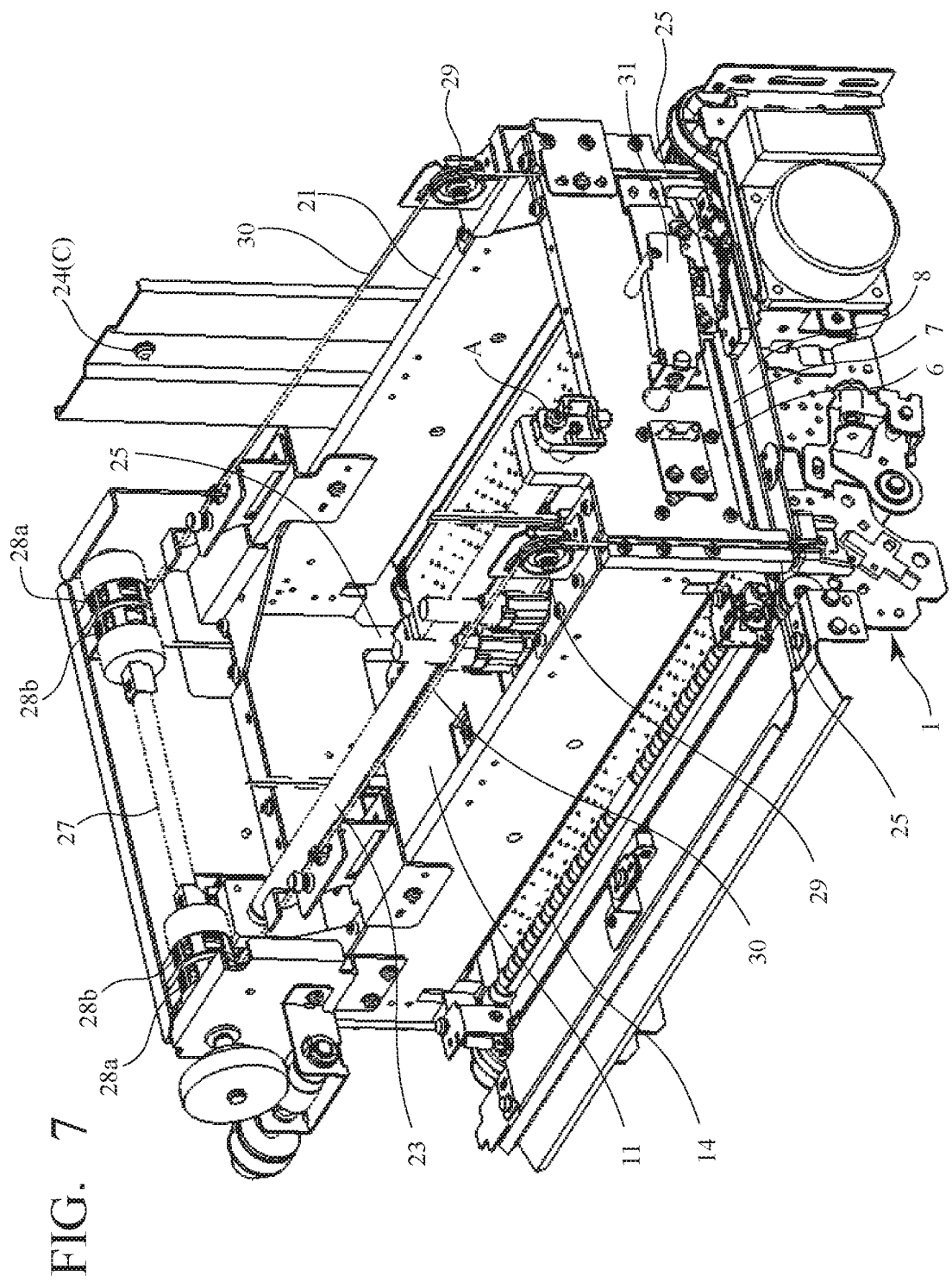
FIG. 7 is a perspective view illustrating one example of upstream-side suction conveyance unit, inspection section and so forth of the image inspection device according to the embodiment of the present invention when seen diagonally from above.

As illustrated particularly in FIG. 4, FIG. 5 and FIG. 7, first, a winding shaft 27 is installed on one wall of the first support section 21 which is parallel with the inspection object conveyance direction on the opposite side of the first suction conveyance unit 1 in parallel with the inspection object conveyance direction. As illustrated particularly in FIG. 5 and FIG. 7, every two pulleys 28a and 28b are installed on both ends of the winding shaft 27. In addition, pulleys 29 and 29 are installed respectively on two corners of the other wall of the first support section 21 which is parallel with the inspection object conveyance direction on the opposite side of the first suction conveyance unit 1. A suspension wire 30 is wound around the pulleys 28a and 28b of the winding shaft 27 with its base end being coupled thereto. Two suspension wires 30 and 30 of the outer two pulleys 28a and 28a in every two pulleys on the both ends of the winding shaft 27 are led out in a direction which is orthogonal to the inspection object conveyance direction, are wound around the two pulleys 29 and 29 which are located on the opposite side of the winding shaft 27 respectively, are guided to the lower side first suction conveyance unit 1 along the two grooves 26 and 26 which are formed in the two support legs 25 and 25 and are coupled to two places of the platen 8 on which the two support legs 25 and 25 abut at respective leading ends thereof in addition, the two suspension wires 30 and 30 of the inner two pulleys 28b and 28b in the every two pulleys on the both ends of the winding shaft 27 are guided downward along the two grooves 26 and 26 which are formed in the two support legs 25 and 25 which are located directly under the wires 30 and 30 and are coupled to two places of the platen 8 on which the two support legs 25 and 25 abut at respective leading ends thereof.

A handle 31 which is rotationally movable through 360 degrees is installed on the wall of the first support section 21 which is opposite to the wall on which the winding shaft 27 is installed with the conveyor belt 6 being sandwiched. Although details are not illustrated, a rotary shaft of the handle 31 is coupled to the winding shaft 27 in linkage with the winding shaft 27 via a transmission mechanism such as a belt, a pulley, a worm, a wheel and so forth. Accordingly, it becomes possible to wind the suspension wires 30 on the pulleys 28a and 28b, to lift the platen 8, to press the platen 8 against the leading ends of the four support legs 25 of the first support section 21 with necessary force and thereby to position the platen 8 by rotationally moving the winding shaft 27 in a predetermined direction by operating the handle 31. Here, since each suspension wire 30 is arranged in the groove 26 of each support leg 25 and is coupled to the platen 8, force that the suspension wire lifts the platen 8 directly works on a position on which each support leg 25 abuts. Accordingly, an action of fixing the platen 8 (that is, the first suction conveyance unit 1) onto the support legs 25 becomes sure. Incidentally, although force which is necessary to lift the first suction conveyance unit 1 with the suspension wire 30 depends on weight and so forth of each component, the force may be set to, for example, 7 N for every suspension wire 30, that is, to 28 N in total for the four suspension wires 30.

The first support section 21 on which the first inspection section 11 is loaded positions the platen 8 so as to match a virtual plane which is defined by the leading ends of the four support legs 25 and fixes the platen 8 at a position concerned with the necessary force in this way. Accordingly, the first inspection section 11 which is attached to a predetermined position of the first support section 21 becomes parallel with the inspection object conveyance surface which faces the first inspection section 11 and a distance between the first inspection section 11 and the conveyance surface reaches a fixed value which is determined in advance. In addition, even when the platen 8 is not in its original flattened surface form and there are some problems in flatness, it is also possible to correct the flatness of the platen 8 with the aid of force which works to pull the platen 8 with the suspension wires 30 and to bring the platen 6 into abutment on the support legs 25.

Although description is made on the assumption that the inspection sections 11 and 12 of the present embodiment are configured by the CISs, in general, the CIS is shallow in depth of field and a high arrangement accuracy is required for obtaining an expected reading accuracy. For example, tolerance when setting to a distance of about 12 mm is about ±0.2 mm. Accordingly, the high accuracy becomes necessary for positioning of the CISs and the inspection object conveyance surface. However, according to the present embodiment, the first inspection section 11 is attached to the first support section 21 so as to be parallel with the virtual plane which is configured by respective leading end faces of the four support legs 25 which are formed on the first support section 21 and the platen 8 is fixed in the virtual plane by abutting the respective support legs 25 of the first support section 21 on the platen 8. Thereby, the platen 8 becomes parallel with the first inspection section 11 and it becomes possible to properly inspect the images on the inspection object which is conveyed by the first suction conveyance unit 1 with expected accuracy by the first inspection section 11.

Although the first support section 21 and the first suction conveyance unit 1 are described above as the mechanism which performs positioning by pulling the first and second suction conveyance units 1 and 2 with the suspension wires 30 into abutment on the support legs 25 of the first and second support sections 21 and 22 respectively, the second support section 22 and the second suction conveyance unit 2 are configured as the mechanism which is almost the same as that of the first support section 21 and the first suction conveyance unit 1 functionally, and therefore the description thereof is omitted by quoting the description of the first support section 21 and so forth. However, as illustrated on the right side in FIG. 5, the direction of the force and so forth of the second support section 22 is different from that of the first support section 21 and so forth in that in the second support section 22, the second suction conveyance unit 2 which is located above the second support section 22 is pulled downward with the four suspension wires 30 into abutment on the upper end faces of the upward protruding four support legs 25 as illustrated on the right side in FIG. 5. Incidentally, the first and second support sections 21 and 22 of the present embodiment are configured to position the platen 8 so as to match the virtual plane which is defined by the leading ends of the four support legs 25. However, it is sufficient that the virtual plane be uniquely determined by the leading ends of the support legs 25 and therefore three or more support legs 25 may formed. In addition, the positioning accuracy of the platen 8 may be further increased by forming five or more support legs 25.

As illustrated particularly in FIG. 4 to FIG. in the first support section 21, the long support shaft 23 which is orthogonal to the inspection object conveyance direction is bridged on the upstream aides of one pair of walls of the first support section 21 which is parallel with the inspection object conveyance direction. Both ends of the long support shaft 23 project to the outside of the walls and the long support shaft 23 is coupled to the frame (not illustrated) of the image inspection device 200 to be rotationally movable as indicated by a bidirectional arrow around the long support shaft 23 in FIG. 5. That is, the first support section 21 is attached to be rotationally movable in an orientation that the downstream side or the upstream side of the conveyor belt 6 vertically swings around the long support shaft 23. In addition, in the first support section 21, a lower end of a coupling plate 32 which extends upward is fixed to downstream-side central parts of one pair of walls of the first support section 21 which is orthogonal to the inspection object conveyance direction. An upper end of the coupling plate 32 is coupled to the frame (not illustrated) of the image inspection device 200 to be rotationally movable by the short support shaft 24 which is parallel with the inspection object conveyance direction. A central axis of the short support shaft 24 is orthogonal to a central axis of the long support shaft 23 and is almost horizontal. The first support section 21 is supported on the frame in a state of being rotationally movable in both diagonally forward direction and diagonally rearward direction of the paper sheet around the short support shaft 24 as indicated by a bidirectional arrow around the short support shaft 24 in FIG. 5. Accordingly, the both ends of the long support shaft 23 serve as the support points A and B (see FIG. 3) which support the first support section 21 on the frame to be rotationally movable and the short support shaft 24 serves as the support point C (see FIG. 3) which supports the first support section 21 on the frame to be rotationally movable. Since the second support section 22 has the structure which is almost the same as the structure of the first support section 21 in function and is attached to the frame in the same way, description thereof is omitted by quoting the description of the first support section 21 and so forth. A state where the first support section 21 is supported at the support points A, B and C is not fixed in this way. Therefore, in a case where certain external force is applied to the frame and thereby the frame is deformed, since the first support section 21 is in a state of being supported to be rotationally movable in two orthogonal planes which are illustrated in FIG. 5 respectively, the posture is maintained as soon as possible by releasing the force which is transmitted from the frame so as to avoid deformation of the first support section 21 and occurrence of a change which is harmful to its arrangement relation with the second support section 22.

As described above, in the present embodiment, the first and second support sections 21 and 22 which load the first and section inspection sections 11 and 12 respectively are supported at the three points A, B, and C in a state of not being fixed, that is, being rotationally movable relative to the frame of the image inspection device 200. Thus, the following effects are obtained owing to the abovementioned structure. That is, in a case where the image inspection device 200 is installed on a floor which is low in flatness and in a case where although heights of the four support legs 25 of the image inspection device 200 are adjusted by an adjustor so as to cope with installation of the image inspection device 200 on the floor which is low in flatness, height adjustment is not performed perfectly and thereby a difference occurs among the heights of the support legs 25, the image inspection device 200 shifts to an inclined posture which deviates from a necessary horizontal state in either case. Therefore, the external force is applied to the frame of the image inspection device 200 and distortion occurs. When the distortion occurs in the frame, in a case where the first and second support sections 21 and 22 are directly fixed to the frame, firstly, the distortion also occurs in the first and second support sections 21 and 22 and a positional relation between each of the first and second inspection sections 11 and 12 which are attached to the first and second support sections 21 and 22 respectively and the inspection object conveyance surface changes. In addition, secondarily, also a mutual positional relation between the first inspection section 11 and the second inspection section 12 changes. As a result, a trouble that the first and second inspection sections 11 and 12 erroneously detect the images on the inspection object occurs.

However, according to the present embodiment, the first and second support sections 21 and 22 which load the first and second inspection sections 11 and 12 respectively are supported on the frame of the image inspection device 200 at the three points A, B, and C in a non-fixed state. Therefore, even in a case where useless external force is applied to the frame of the image inspection device 200 and the distortion occurs in the frame, the distortion is difficult to transmit to the first and second support section 21 and 22, the regular positional relation between each of the first and second inspection sections 11 and 12 which are attached to the first and second support sections 21 and 22 respectively and each of the first and second suction conveyance units 1 and 2 is maintained, and a change is difficult to occur in the properly set mutual positional relation between the first inspection section 11 and second inspection section 12. Consequently, a trouble that the first and second inspection sections 11 and 12 erroneously detect the images on the inspection object does not occur.

Figure 6:
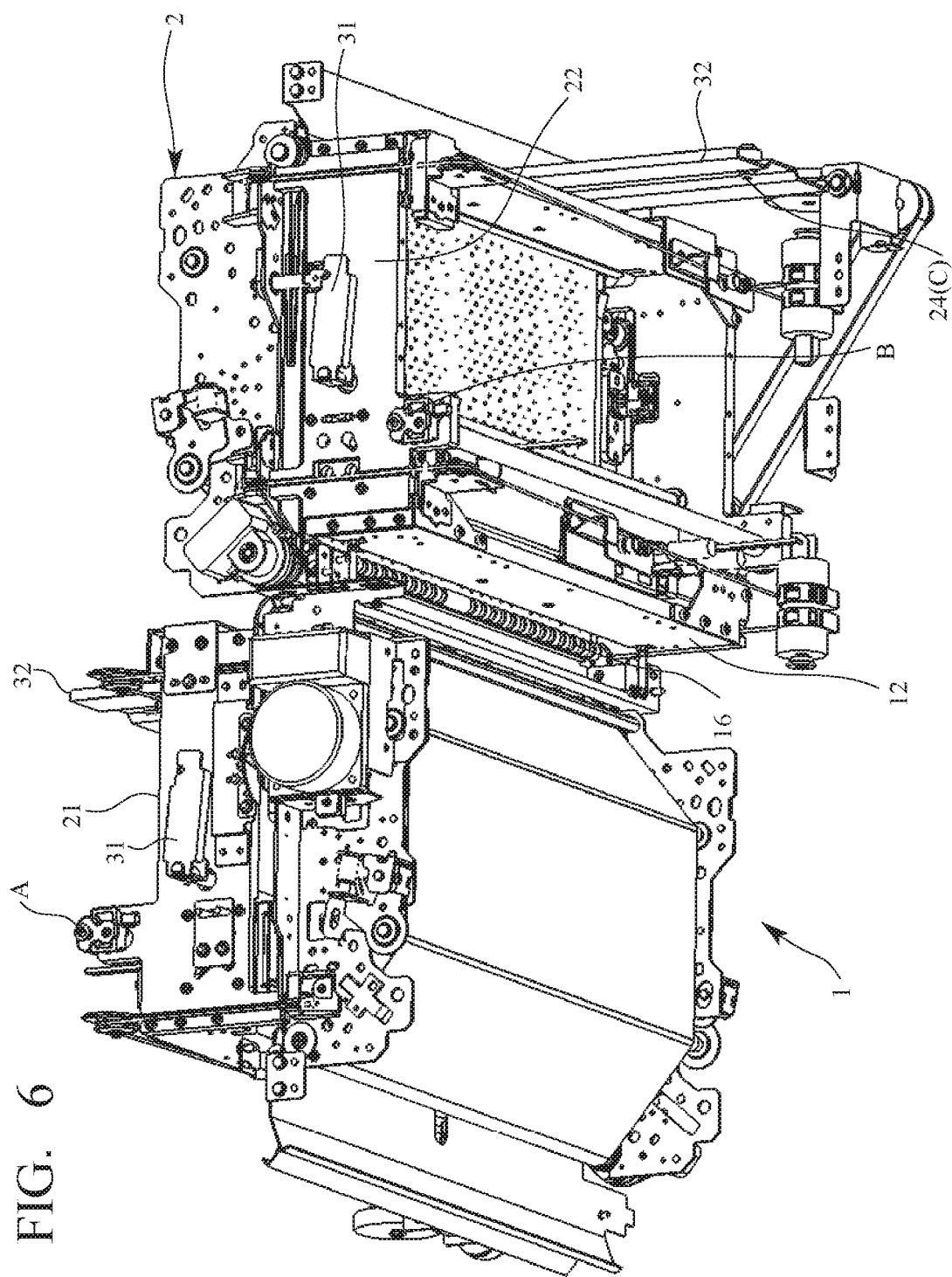
FIG. 6 is a perspective view illustrating one example of the image inspection device according to the embodiment when seen diagonally from below.
Figure 6A:
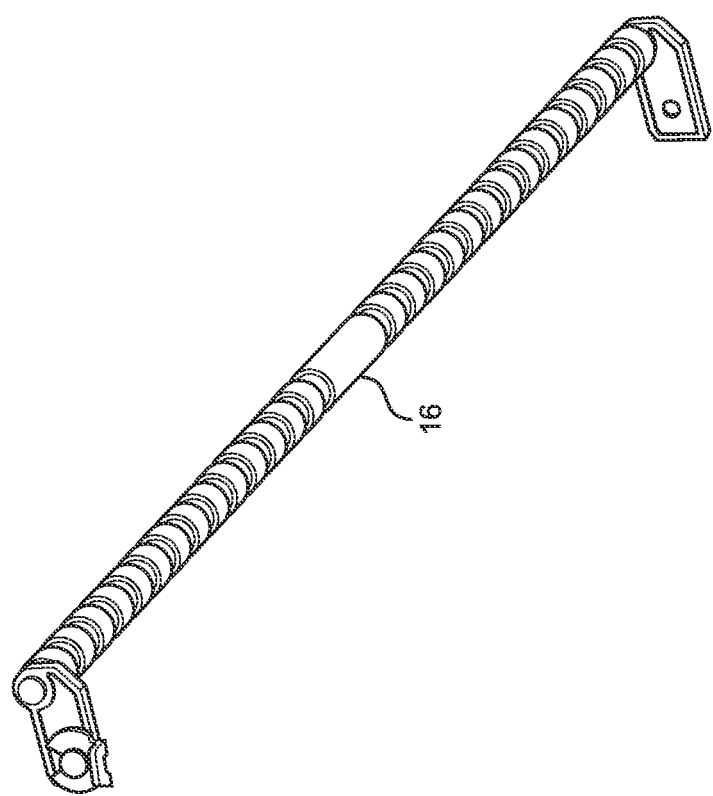
FIG. 6A is a partial enlarged view of a roller shown in FIG. 6.
Figure 8:
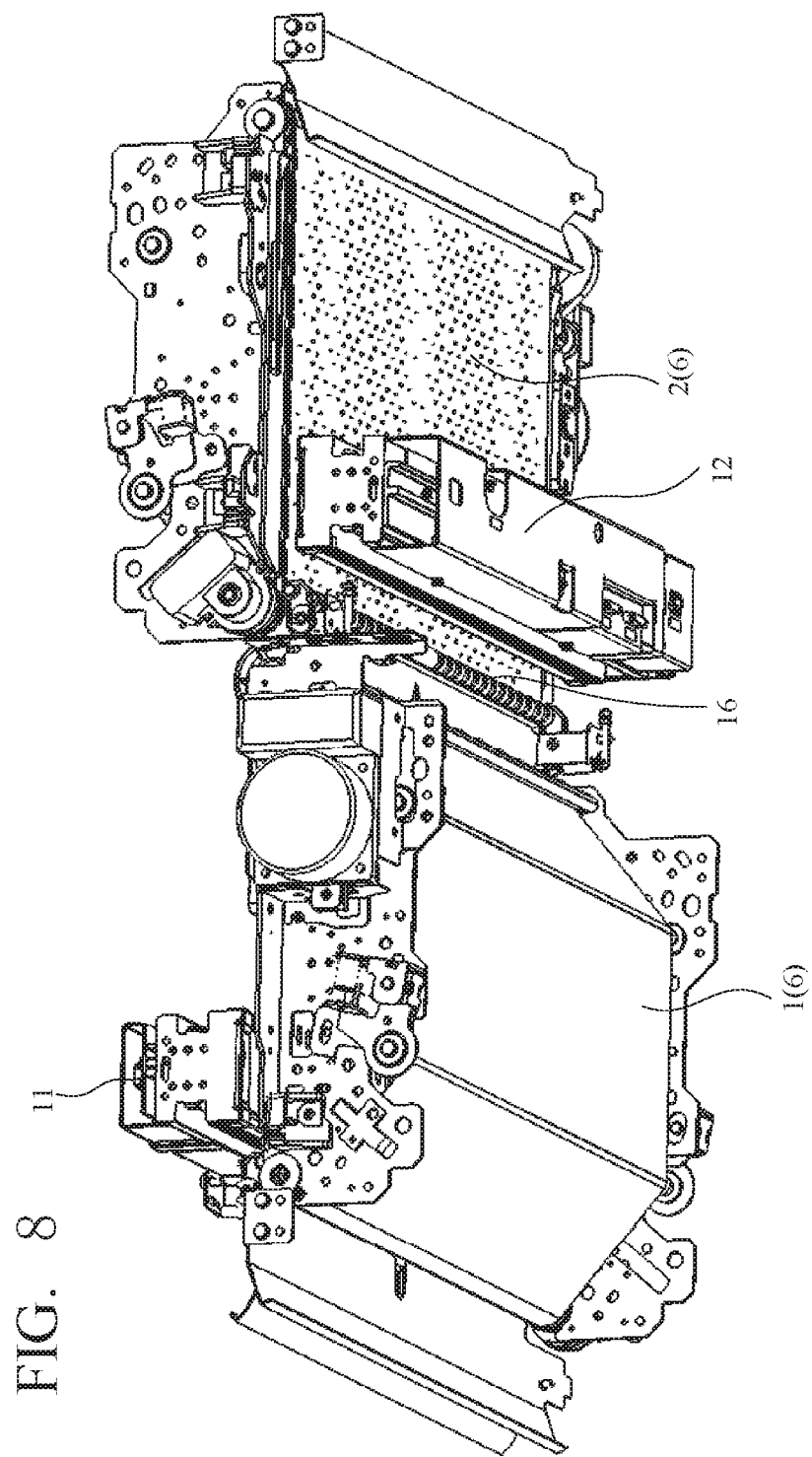
FIG. 8 is a perspective view illustrating one example of the suction conveyance unit and the inspection section of the image inspection device according to the embodiment of the present invention when seen diagonally from below.

As illustrated particularly in FIG. 6 and FIG. 8, the hanging prevention roller 16 is installed at a position which corresponds to a part under the driven roller 4 of the second suction conveyance unit 2, that is, the position which is located under the upstream-side end of the second suction conveyance unit 2. As described before with reference to FIG. 2 the hanging prevention roller 16 is the hanging prevention member which prevents the top edge of the inspection object which is introduced via the intermediate guide plate 15 from hanging downward. The hanging prevention roller 16 has a roller portion which is divided into a pectinate shape in an axial direction which is orthogonal to the inspection object conveyance direction. When the inspection object is sent from the upstream first suction conveyance unit 1 into the second suction conveyance unit 2, the top edge of the inspection object abuts on the hanging prevention roller 16 and runs on the hanging prevention roller 16 before the top edge of the inspection object hangs down under its own weight or because of downward curling, and then the inspection object is sandwiched between the conveyor belt 6 and the hanging prevention roller 16 and suction conveyance of the inspection object by the second suction conveyance unit 2 is started. Alternatively, before the top edge of the inspection object hangs down, the top edge is sandwiched between the hanging prevention roller 16 and the conveyor belt 6 and the suction conveyance of the inspection object by the second suction conveyance unit 2 is started.

As described above, in the present embodiment, the hanging prevention roller 16 is installed at an inspection object delivering position between the first suction conveyance unit 1 and the second suction conveyance unit 2. Owing to the abovementioned structure, the following effects are obtained. That is, in the image inspection device 200 according to the present embodiment, the first inspection section 11 reads the image on the upper surface of the inspection object at the entrance of the first suction conveyance unit 1 and a timing that the second inspection section 12 starts reading the image on the lower surface of the inspection object is set from a timing that the first inspection section 11 performs image reading and a later conveyance length. Propriety is decided by collating the images which are detected by the CISs which configure the first and second inspection sections 11 and 12 with original image data and a definition of the images which are detected by the CISs is as high as about 300 dpi to about 600 dpi. Therefore, in a case where the top edge of the inspection object hangs down when the inspection object is delivered between the first suction conveyance unit 1 and the second suction conveyance unit 2, a time lag occurs in a timing that the inspection object enters the second suction conveyance unit 2 and erroneous image detection occurs when reading the images on the inspection object by the second inspection section 12. However, according to the present embodiment, since the hanging prevention roller 16 is installed at the entrance of the second suction conveyance unit 2, the trouble that the top edge of the inspection object hangs down under its own weight does not occur, no time lag occurs in timing of image reading by the second inspection section 12 which is set on the basis of the reading timing and so forth by the first inspection section 11, and the trouble of erroneous detection does not occur.

In addition, in a case when the top edge of the inspection object is seen along a line of sight which is parallel with the conveyance direction, there are cases where wavy deformation (cockling) is observed. Since occurrence of such deformation leads to a reduction in accuracy of inspection by the inspection section such as the CIS and so forth and induces the erroneous detection, it is preferable to correct the deformation to the greatest possible extent. In the present embodiment, since the hanging prevention roller 16 sandwiches the inspection object between its pectinate roller portion and the conveyor belt 6, cockling of the inspection object is corrected in shape in a direction that a crest of cockling is leveled and a depth of a trough is reduced and consequently the deformation is changed to a wavy form which is smaller in cycle, the result which is the same as the result of cockling correction is attained and an effect of preventing erroneous detection of the images by the first and second inspection sections 11 and 12 is obtained.

As illustrated particularly in FIG. 9 to FIG. 12, the first support section 21 is equipped with a first conveyance direction adjustment element which adjusts the direction that the inspection object is conveyed by the first suction conveyance unit 1. In the first support section 21, a fixing pin 35 is installed on one of walls making a pair which is parallel with the inspection object conveyance direction in a state of projecting downward. The fixing pin 35 is inserted into a positioning hole 36 which is formed in the platen 8. In addition, a movable pin 37 is installed on the other of the walls making the pair which is parallel with the inspection object conveyance direction in a state of projecting downward. The movable pin 37 is eccentrically attached to a lower surface of a cylindrical operation member 38 which is attached to the first support section 21 to be rotationally movable and is inserted into a slot 39 which is formed in the platen 8. An operation handle 40 which rotationally moves the operation member 38 is installed on a circumferential surface of the operation member 38. A scale plate 41 which indicates an angle through which the operation member 38 rotationally moves is attached around the operation member 38.

Figure 10:
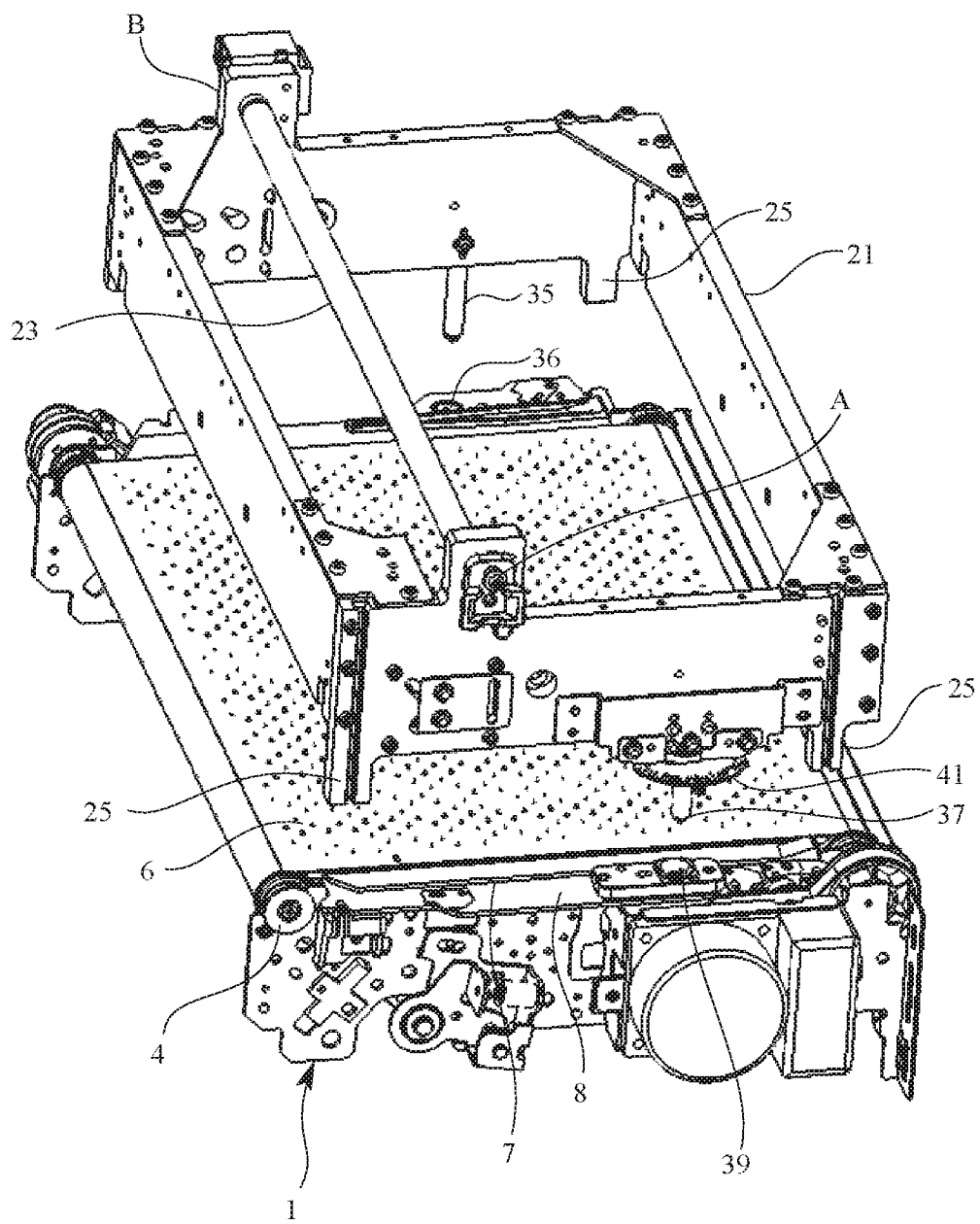
FIG. 10 is an exploded hierarchical perspective view illustrating one example of the upstream side holding section and suction conveyance unit of the image inspection device according to the embodiment of the present invention when seen diagonally from above.

In a case where the first suction conveyance unit 1 is pulled up from a state which is illustrated in FIG. 10 with the suspension wires 30 (not illustrated in FIG. 10) and is brought into abutment on the four support legs 35 of the first support section 21, the fixing pin 35 is inserted into the positioning hole 36, the movable pin 37 is inserted into the slot 39 and thereby the first suction conveyance unit 1 shifts to a state illustrated in FIG. 7. This state corresponds to the state which is illustrated in FIG. 5 as a whole including the second suction conveyance unit 2 and the second inspection section 12 and indicates a state in ordinary use. In a case of occurrence of a trouble in inspection accuracy of the first inspection section 11 and so forth caused by insufficient flatness of the first inspection section 11 and the first suction conveyance unit 1 under such ordinally use, it becomes necessary to correct the direction that the inspection object is conveyed by the first suction conveyance unit 1.

Figure 11:
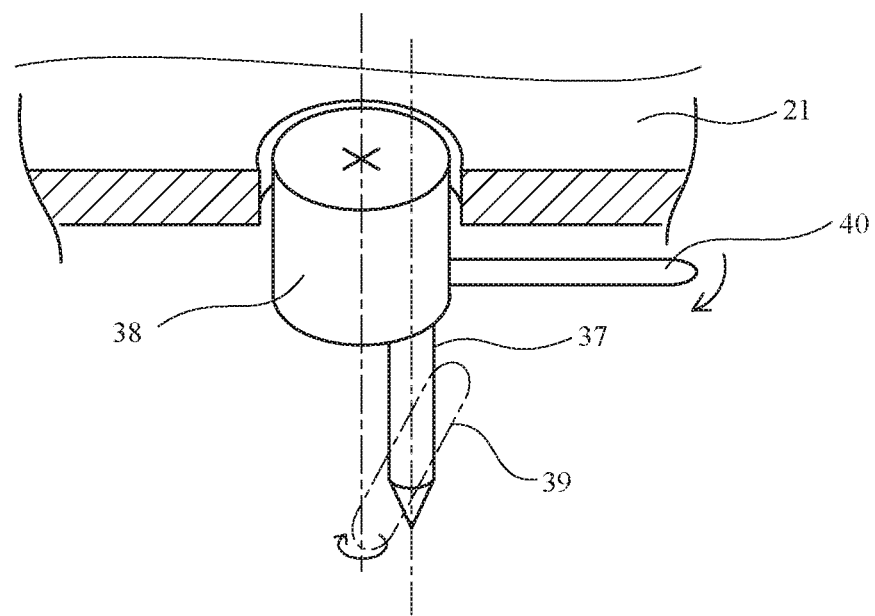
FIG. 11 is a schematic perspective view illustrating one example of a conveyance direction adjustment element which adjusts the conveyance direction that the suction conveyance unit conveys the inspection object to the inspection section in the image inspection device according to the embodiment of the present invention.
Figure 12:
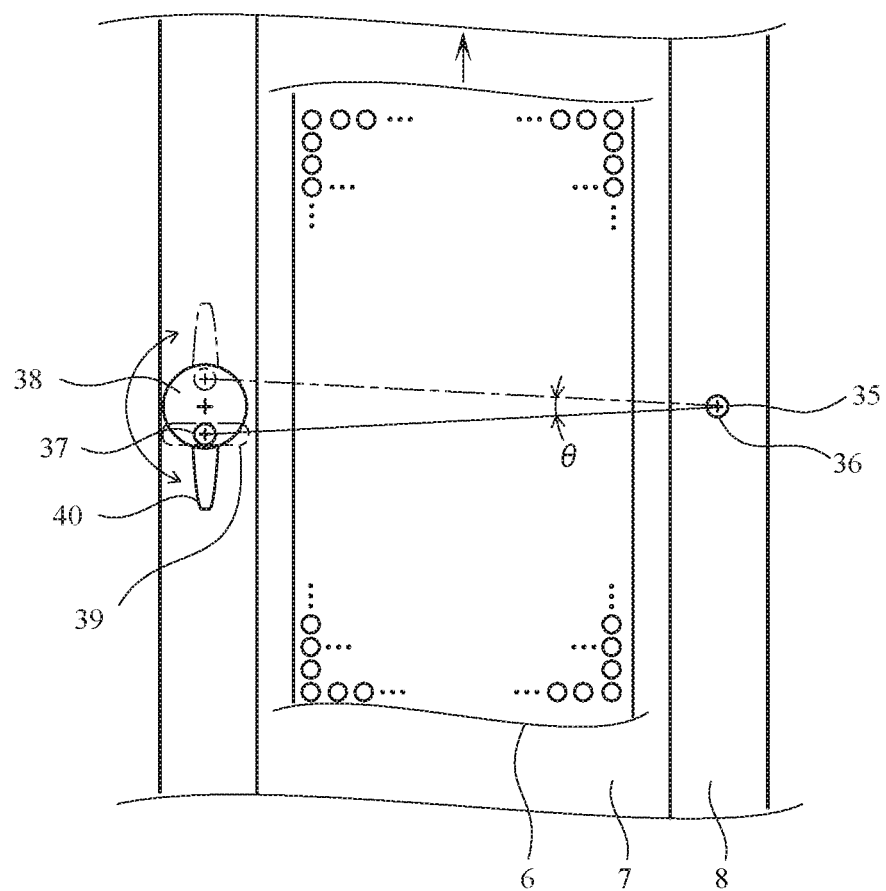
FIG. 12 a schematic plan view illustrating one example of the conveyance direction adjustment element which adjusts the conveyance direction that the suction conveyance unit conveys the inspection object to the inspection section in the image inspection device according to the embodiment of the present invention.

In a case where the direction that the inspection object is conveyed by the first suction conveyance unit 1 is corrected by using the first conveyance direction adjustment element, first, the force of the suspension wires 30 to pull up the first suction conveyance unit 1 is properly reduced to shift to a state where the platen 8 is slidable relative to the support legs 25. Then, as illustrated in FIG. 11 and FIG. 12, the operation member 38 is rotated by a necessary angle by the operation handle 40 and the movable pin 37 is turned by a necessary amount. It is possible to read a fluctuation of the angle according to an operation amount of the operation handle 40 from the scale plate 41. It is possible to adjust the orientation of the platen 8 of the first suction conveyance unit 1 by a maximum angle θ around the fixing pin 35 by performing such operations as described above. After adjustment, the force of pulling-up by the suspension wires 30 is properly increased thereby to fix the platen 8 to the support legs 25.

As described above, in the present embodiment, the mechanism which adjusts the orientations of the first and second suction conveyance units 1 and 2 relative to the first and second support sections 21 and 22 which load the first and second inspection sections 11 and 12 respectively and thereby changes the inspection object conveyance direction is installed. Therefore, in a case where a trouble occurs in the positional relation between each of the first and second inspection sections 11 and 12 and the inspection object conveyance direction for some reasons, it is possible to correct the positional relation between each of the inspection sections 11 and 12 and the inspection object conveyance direction by operating the operation handle 40 and thereby to prevent occurrence of the erroneous detection. In addition, in a case where skewing of the inspection object occurs on the first suction conveyance unit 1, a timing that the top edge of the inspection object reaches the hanging prevention roller 16 is delayed when delivering the inspection object to the second suction conveyance unit 2 and thereby there is the possibility that the effect of preventing hanging the aforementioned hanging prevention roller 16 may be reduced. However, it becomes possible to surely secure the effect of hanging prevention by the aforementioned hanging prevention roller 16 by adjusting the inspection object conveyance direction of the upstream side first suction conveyance unit 1 by operating the operation handle 40 so as to correct skewing of the inspection object and making the respective conveyance directions of the first suction conveyance unit 1 and the second suction conveyance unit 2 match each other.

Incidentally, a second conveyance direction adjustment element which adjusts the direction that the inspection object is conveyed by the second suction conveyance unit 2 is installed also on the second support section 22 similarly to the first support section 21. However, the configuration of the second conveyance direction adjustment element is the same as the structure of the first conveyance direction adjustment element in function and therefore repetitive description is avoided by quoting the description of the first conveyance direction adjustment element.

<<Modified Examples of Image Inspection Device According to Embodiment>>

Modified examples of the image inspection device 200 according to the embodiment of the present invention will be described with reference to FIG. 13 to FIG. 18.

Figure 13:
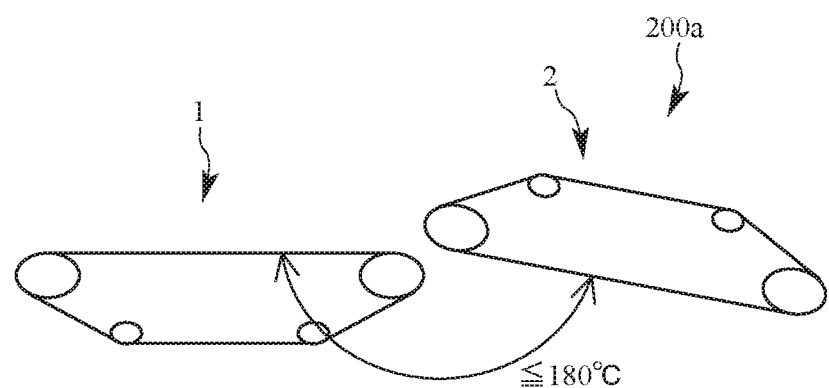
FIG. 13 is a schematic front view illustrating a first modified example of the image inspection device according to the embodiment of the present invention.

FIG. 13 is a schematic front view illustrating a first modified example of the image inspection device 200. Although an image inspection device 200a according to a first modified example is the same as the image inspection device 200 according to the embodiment in that the first suction conveyance unit 1 and the second suction conveyance unit 2 are arranged on the upstream side and the downstream side respectively along the inspection object conveyance direction, the conveyance surface of the second suction conveyance unit 2 has an angle which is inclined downward toward the downstream side relative to the conveyance surface of the first suction conveyance unit 1.

Although, in the embodiment, the respective conveyance directions of the first suction conveyance unit 1 and the second suction conveyance unit 2 match each other, in such a configuration, there are cases where the top edge of the inspection object which is delivered to the second suction conveyance unit 2 hangs down and therefore the inspection object is not sucked onto the second suction conveyance unit 2 properly and delivery of the inspection object is not smoothly performed. In such a case, the downstream-side end of the second suction conveyance unit 2 is lowered slightly downward so as to make the above-described inclined angle as in the first modified example. For setting the inclined angle, it is possible to adjust the inclined angle by reducing tension of the suspension wire 30 which suspends the second suction conveyance unit 2 on the downstream side in comparison with the tension on the upstream side.

A specific example of the inclined angle will be described. For example, paper and so forth of thickness which is at least about 200 g/cm$^2$ in weighting is strong in tensility and therefore this paper is difficult to hang down when delivered. Therefore, it is preferable to set an angle between the conveyance surface of the first suction conveyance unit 1 and the conveyance surface of the second suction conveyance unit 2 to about 177 degrees which is not more than 180 degrees in the angle which is measured under both the first and second suction conveyance units 1 and 2. That is, in this case, an angle by which the downstream-side end of the second suction conveyance unit 2 is lowered is about three degrees. For example, in a case of thin paper which is about 40 g/cm$^2$ in weighting, since the thin paper is weak in tensility and is easy to hang down when delivered. Therefore, it is preferable to set the angle between the conveyance surface of the first suction conveyance unit 1 and the conveyance surface of the second suction conveyance unit 2 to about 170 degrees in the angle which is measured under both the suction conveyance units 1 and 2. That is, an angle by which the downstream-side end of the second suction conveyance unit 2 is lowered is about 10 degrees.

According to the image inspection device 200a, even in a case where the top edge of the inspection object which is conveyed from the first suction conveyance unit 1 to the second suction conveyance unit 2 hangs down from the conveyance surface of the first suction conveyance unit 1 downward due to the paper quality and so forth, the inspection object is pressed against the conveyance surface of the second suction conveyance unit 2 which is inclined downward toward the downstream side and therefore the inspection object is surely sucked and held on the conveyance surface and is stably conveyed toward the downstream side.

In addition, in the image inspection device 200*a*, the angle which is inclined downward toward the downstream side of the conveyance surface of the second suction conveyance unit 2 may be set in accordance with image formation conditions when forming the images on the inspection object. Here, as the image formation conditions, an orientation of the inspection object, a printing amount, arrangement balance of a printing range in an image forming surface on the inspection object and so forth may be given by way of example in addition to the kind of the inspection object which is expressed by the above-described weighting. The aforementioned inclined angle may also be set to a proper value manually or automatically in accordance with these image formation conditions.

Figure 14:
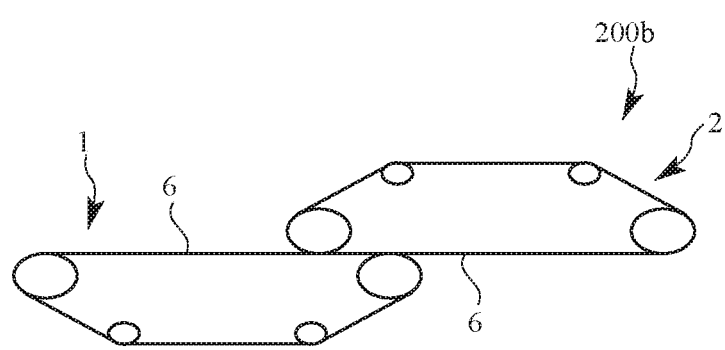
FIG. 14 is a schematic front view illustrating a second modified example of the image inspection device according to the embodiment of the present invention.

FIG. 14 is a schematic front view illustrating a second modified example.

In an image inspection device 200*b* according to the second modified example, the conveyance surface of the downstream-side end of the first suction conveyance unit 1 and the conveyance surface of the upstream-side end of the second suction conveyance unit 2 are mutually superimposed. Other configurations are the same as the configurations of the image inspection device 200 according to the embodiment. On a part where the two conveyance surfaces are mutually superimposed, the two conveyor belts 6 and 6 face each other leaving a space of not more than about 0.5 mm in a vertical direction. As one example, since there are many cases where a thickness of paper on which images are formed by the image forming apparatus is about 0.2 mm in a case of thick paper, in such a case, when a space between the two conveyor belts 6 and 6 is not more than about 0.5 mm, there is no trouble in delivery of the inspection object. According to the second modified example, there are effects that it is not necessary to install a mechanism (for example, the intermediate guide plate 15 illustrated in FIG. 2) used for delivery of the inspection object between the upstream-side first suction conveyance unit 1 and the downstream-side second suction conveyance unit 2 and delivery is performed smoothly.

Figure 15:
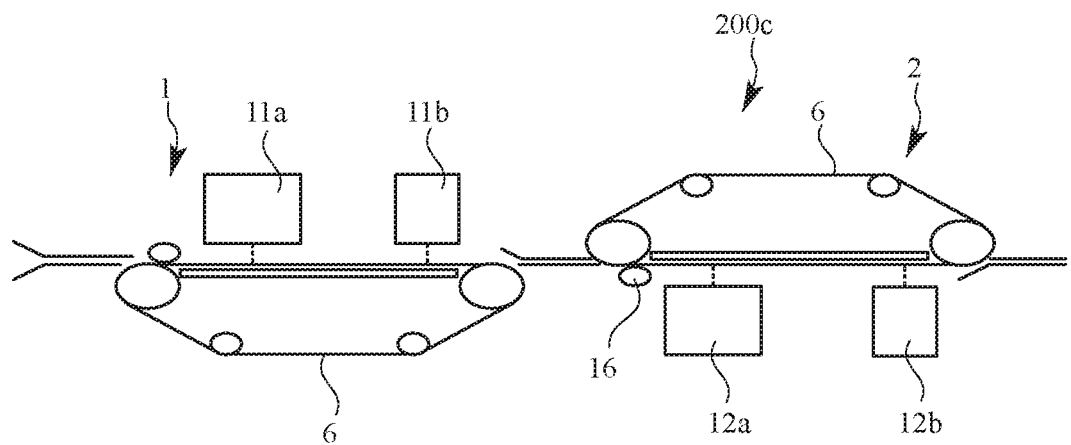
FIG. 15 is a schematic front view illustrating a third modified example of the image inspection device according to the embodiment of the present invention.

FIG. 15 is a schematic front view illustrating a third modified example.

In an image inspection device 200*c* according to the third modified example, cameras 11*a* and 12*a* and CISs 11*b* and 12*b* are installed on the first suction conveyance unit 1 and the second suction conveyance unit 2 respectively as the inspection sections. In both of the first and second suction conveyance units 1 and 2, the CISs 11*b* and 12*b* which are relatively high in required arrangement accuracy (shallow in depth of field) are arranged relatively on the downstream side of the inspection object conveyance direction, and the cameras 11*a* and 12*a* which are relatively low in required arrangement accuracy (deep in depth of field) are arranged relatively on the upstream side of the inspection object conveyance direction. Other configurations are the same as the configurations of the image inspection device 200 according to the embodiment. In the first and second suction conveyance units 1 and 2, the force of sucking the inspection object which is being conveyed is higher in a state where the inspection object is sucked onto a part which reaches the downstream side of the conveyor belt 6 and is conveyed with most of the holes closed than in a state where the inspection object is sucked only onto an upstream side part of the conveyor belt 6 and is conveyed with most of the holes not closed. That is, in a case where cockling and curling are observed on the paper, the paper is difficult to closely adhere to the conveyor belt 6 in the former state and the paper is easy to closely adhere to the conveyor belt 6 in the latter case. Therefore, it becomes possible to arrange different kinds of inspection sections 11 and 12 with arrangement accuracies which are necessary for making the inspection sections 11 and 12 function with respective inspection accuracies and to secure the levels of the inspection accuracies of the respective inspection sections 11 and 12 by arranging the cameras 11*a* and 12*a* which are relatively low in accuracy (deep in depth of field) and the CISs 11*b* and 12*b* which are relatively high in accuracy (shallow in depth of field) on the respective first and second suction conveyance units 1 and 2 as described above.

Figure 16:
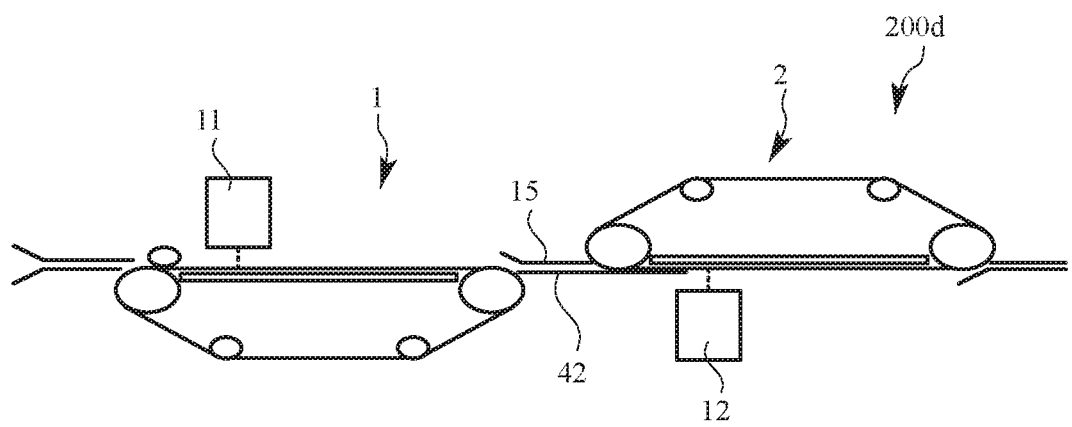
FIG. 16 is a schematic front view illustrating a fourth modified example of the image inspection device according to the embodiment of the present invention.

FIG. 16 is a schematic front view illustrating a fourth modified example.

An image inspection device 200*d* according to the fourth modified example has a hanging prevention member 42 which is formed by extending a plate body which is located under the intermediate guide plate 15 up to a part under the upstream-side end of the second suction conveyance unit 2 between the first suction conveyance unit 1 and the second suction conveyance unit 2. Other configurations are the same as the configurations of the image inspection device 200 according to the embodiment. Owing to arrangement of the hanging prevention member 42, the effect of preventing the top edge of the inspection object which is delivered from the first suction conveyance unit 1 to the second suction conveyance unit 2 from hanging down under its own weight and due to occurrence of curling and so forth is obtained as in the case of the aforementioned hanging prevention roller 16 (see FIG. 2, FIG. 6 and so forth).

Figure 17:
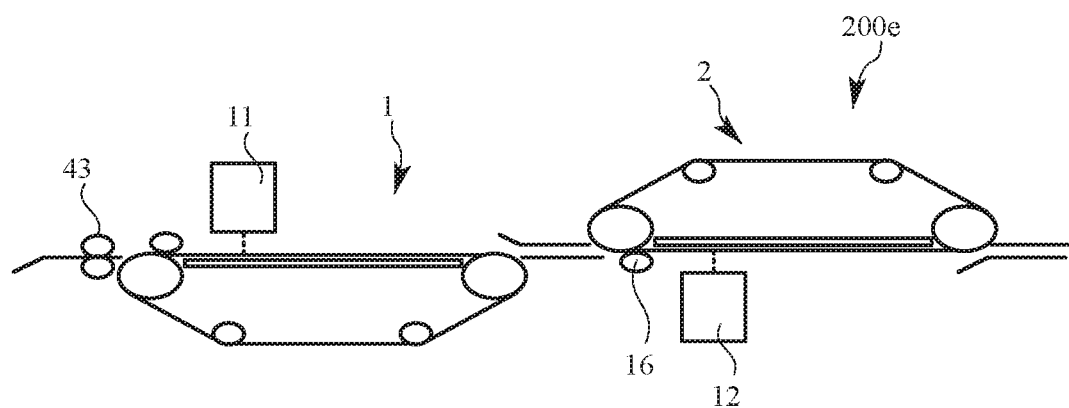
FIG. 17 is a schematic front view illustrating a fifth modified example of the image inspection device according to the embodiment of the present invention.

FIG. 17 is a schematic front view illustrating a fifth modified example.

In an image inspection device 200*e* according to the fifth modified example, a skew correction roller 43 which corrects skewing of the inspection object which is sent from the upstream side of the first suction conveyance unit 1 is installed adjacent to the upstream side of the first suction conveyance unit 1. The skew correction roller 43 is put on standby in a stopped state and starts rotating in the inspection object conveyance direction when the inspection object (the printing paper) abuts on the roller 43. A top edge sensor 44 (see FIG. 4 and FIG. 5) which detects the top edge of the inspection object is installed right next to the upstream side of the skew correction roller 43. When the top edge sensor 44 detects the top edge of the inspection object, the control unit which receives a detection signal from the top edge sensor 44 drives the skew correction roller 43. Other configurations are the same as the configurations of the image inspection device 200 according to the embodiment. Owing to installation of the skew correction roller 43, even in a case where skewing occurs on the printing paper (the inspection object) which is sent from the upstream-side printing device 100, it becomes possible to correct skewing of the printing paper and to send the printing paper to the first inspection section 11 in a proper posture.

Figure 18:
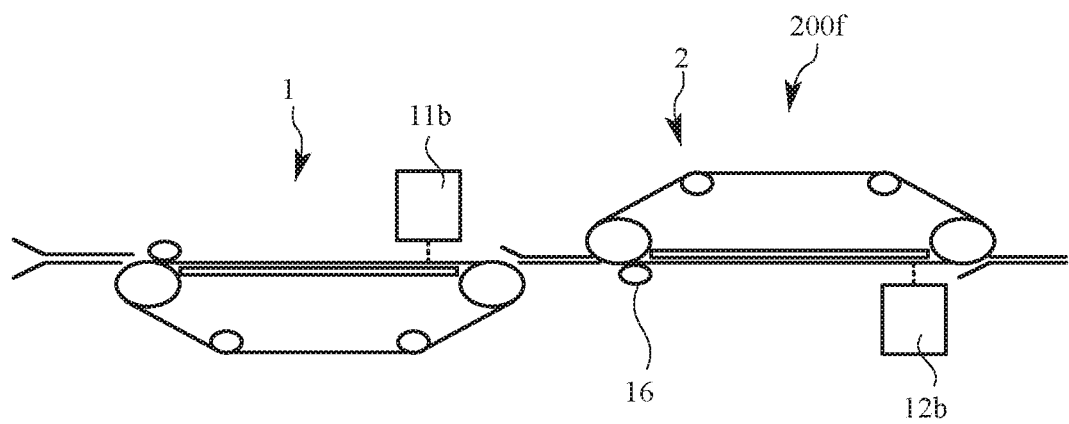
FIG. 18 is a schematic front view illustrating a sixth modified example of the image inspection device according to the embodiment of the present invention.

FIG. 18 is a schematic front view illustrating a sixth modified example.

In an image inspection device 200*f* according to the sixth modified example, the CISs 11*b* and 12*b* are installed on the first suction conveyance unit 1 and the second suction conveyance unit 2 respectively as the inspection sections. The CISs 11*b* and 12*b* as the inspection sections are arranged in the vicinity of the downstream-side ends of both the first suction conveyance unit 1 and the second suction conveyance unit 2. Other configurations are the same as the configurations of the image inspection device 200 according to the embodiment in the first and second suction conveyance units 1 and 2, the force of sucking the inspection object which is conveyed is higher in a state where the inspection object is sucked onto the part which reaches the downstream side of the conveyor belt 6 and is conveyed with most of the holes closed than in a state where the inspection object is sucked only onto the upstream side part the conveyor belt 6 and is conveyed with most of the holes not closed. That is, in the first and second suction conveyance units 1 and 2, as conveyance is promoted toward the downstream side, force that the inspection object which is conveyed is held by the conveyor belt 6 is increased further and holding is stabilized further. Therefore, in view of a fact that the CISs 11b and 12 as the inspection sections are high in arrangement accuracy which is necessary for making the CISs 11b and 12b function with expected inspection accuracy, the CIDs 11b and 12b are arranged on the downstream sides of the respective first and second suction conveyance units 1 and 2 as described above. Thereby, the inspection object which is conveyed by the first and second suction conveyance units 1 and 2 down to the downstream side is stably held by the conveyor belt 6 with the aid of sufficient suction force, and it becomes possible to detect the images on the inspection object by the CISs 11b and 12b with expected high accuracy.

In a case where the top edge of the inspection object is located on the upstream side of the conveyor belt 6 and suction force of a negative pressure and so forth is low, since a rear edge of the inspection object has not yet entered the first suction conveyance unit 1, suction bonding is not performed and the first suction conveyance unit 1 is in a state which is unstable in conveyance of the inspection object. However, when the top edge of the inspection object reaches the rear end of the first suction conveyance unit 1, the entire inspection object is sucked and bonded onto the conveyance surface, conveyance of the inspection object is stabilized, and the possibility that the inspection object may flutter in a height direction is reduced. Then, when the rear edge of the inspection object reaches the first inspection section 11b which is located on the downstream side of the first suction conveyance unit 1, for example, the negative pressure which works on the rear edge of the inspection object becomes lower. However, the top edge of the inspection object is suck onto the conveyance surface of the downstream-side second suction conveyance unit 2, and even when the negative pressure is lowered only on the rear edge of the inspection object, it becomes possible to maintain a stable conveyance state with the aid of inertia of a state where stable conveyance is performed in a state where the negative pressure is high until just before reaching here. However, it is possible to maintain the stable state only with the aid of the above-describe inertia.

Figure 19:
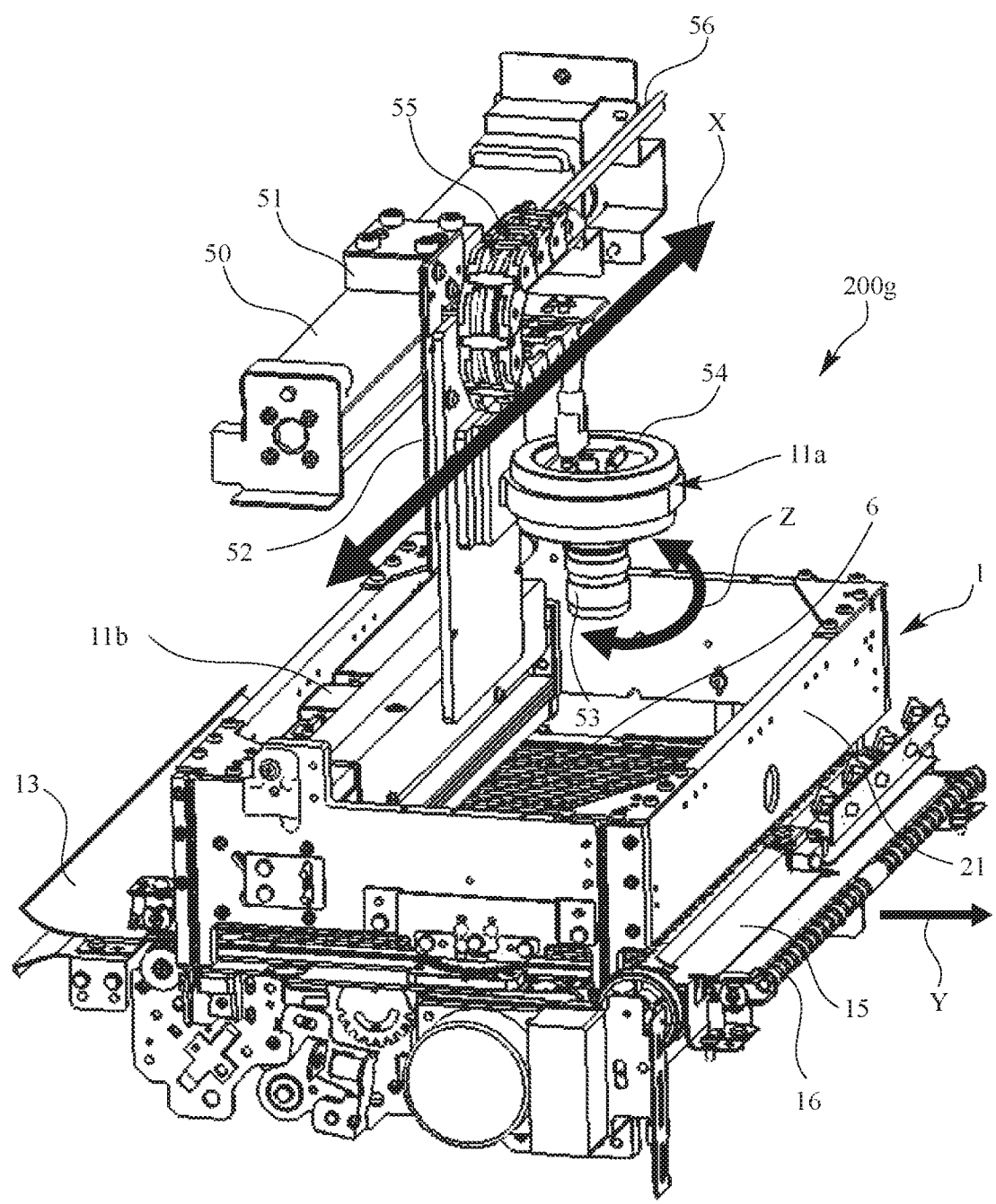
FIG. 19 is a perspective view illustrating one example of the upstream-side suction conveyance unit, inspection section and so forth when seen diagonally from above in a seventh modified example of the image inspection device according to the embodiment of the present invention.

FIG. 19 is a perspective front view illustrating a seventh modified example.

An image inspection device 200g according to the seventh modified example includes the first suction conveyance unit 1 and the second conveyance unit 2. Only the upstream-side first suction conveyance unit 1 is illustrated in FIG. 19 along a line of sight seeing downward diagonally from above diagonally on the downstream side of the front view, and illustration of the downstream-side second suction conveyance unit 2 is omitted. In addition, in the configuration of the first suction conveyance unit 1, illustration of some structures is changed or omitted in FIG. 19 and description of the numerals to be assigned to constituent elements is appropriately omitted. However, configurations of constituent elements other than the inspection sections (for example, the first support section 21, respective parts which configure the conveyance direction adjustment element and so forth) are substantially the same as the configurations of the above-described embodiment and the modified example and therefore repetitive description of these parts is avoided by quoting the preceding description in principle. Incidentally, in FIG. 19, the inspection object conveyance surface is the front surface of the conveyor belt 6 onto which the inspection object is sucked and bonded, and the inspection object conveyance direction is indicated by an arrow Y which is parallel with the conveyance surface. In addition, a width direction of the inspection object which is orthogonal to the inspection object conveyance direction Y is indicated by an arrow X.

As illustrated in FIG. 19, in the first suction conveyance unit 1 of the image inspection device 200g, the CIS 11b as the first inspection section is installed relatively on the upstream side (the left side in FIG. 19) of the inspection object conveyance direction Y. The CIS 11b is an element which inspects the image on the front surface of the inspection object in the linear inspection region on the inspection object which is parallel with the width direction X, an inspection range of the CIS 11b sufficiently covers a widthwise length of the image on the inspection object to be inspected, and it is possible to obtain data on all images which are formed on the inspection object from pixel data which is read out of each of many linear inspection regions which are arrayed in the conveyance direction Y. The depth of field, the arrangement accuracy and so forth of the CIS 11b are as described above.

As illustrated in FIG. 19, in the first suction conveyance unit 1 of the image inspection device 200g, the camera 11a as the third inspection section is installed on the downstream side (the right side in FIG. 19) of the CIS 11b of the inspection object conveyance direction Y. The camera 11a is an element which inspects the image on the front surface of the inspection object in the planar inspection region which is parallel with the inspection object conveyance surface and has a rectangular inspection range which allows reading of an image of a predetermined area (for example, a rectangular range of about 50 mm×100 mm) which has a visually effective dimension in both the conveyance direction Y and the width direction X just like, for example, a QR code. The depth of field, the arrangement accuracy and so forth of the camera 11a are as described above.

As illustrated in FIG. 19, the camera 11a is loaded on a sliding-type moving mechanism and is made movable in the inspection object width direction X, that is, the direction which is parallel with the linear inspection region on the front surface of the inspection object. In the following, the moving mechanism will be described. A guide rail 50 is fixed to a frame of the image inspection device 200g in parallel with the width direction X above the first suction conveyance unit 1. A moving body 51 is installed on the guide rail 50 to be movable along the width direction X. The moving body 51 is manually set to an optional position. However, the moving body 51 may be moved by a driving source (not illustrated) in this case, the moving body 51 may be set to the optional position automatically by the driving source in accordance with a position of the image along the width direction X in the planar inspection region to be detected on the basis of detection information from the upstream-side CIS 11b or various control information and so forth from the control unit. Further, a semi-automatic system that the driving source operates only when an operator closes a conduction switch and thereby the moving body 51 moves may also be adopted. An upper end of a stationary plate 52 is attached to a side face of the moving body 51, and the stationary plate 52 is hanged more downward than the guide rail 50. The aforementioned camera 11*a* is attached to an almost central part of a front surface of the stationary plate 52. The camera 11*a* includes a lens part 53 the focus of which is adjusted by turning a focus ring and a rotation mechanism part 54 which rotates the lens part 53 in a rotation direction which is indicted by an arrow Z. An angle that the lens part 53 is allowed to rotate by the rotation mechanism part 54 is about 90 degrees. Both the focus ring of the lens part 53 and the rotation mechanism part 54 are manually operated and when operating the focus ring and the rotation mechanism part 54, the operator works by opening an open/close door which is located on the front surface of the frame of the image inspection device 200*g* and inserting his/her hand into a place concerned. One end of a bendable cable carrier 55 is coupled to the stationary plate 52 to which the camera 11*a* is attached. The cable carrier 55 bends and changes its direction by about 180 degrees, and the other-end side of the cable carrier 55 is arranged along the guide rail 50 toward one end of the guide rail 50. A control line 56 of the camera 11*a* is drawn around along the cable carrier 55 and is connected to the control unit (not illustrated).

Although not illustrated, the second suction conveyance unit 2 is arranged adjacent to the first suction conveyance unit 1 so as to be turned upside down relative to the first suction conveyance unit 1. Also in the second suction conveyance unit 2, the CIS 12*b* as the second inspection section is arranged relatively on the upstream side and the camera 12*a* as the fourth inspection section is arranged relatively on the downstream side in arrangement which is similar to the arrangement of the CIS 11*b* and the camera 11*a* of the first suction conveyance unit 1. Incidentally, in the second suction conveyance unit 2 the CIS 12*b* and the camera 12*a* which is loaded on the moving mechanism are arranged under the second suction conveyance unit 2 facing upward contrary to the CIS 11*a* and the camera 12*a* of the first suction conveyance unit 1 and inspect the images on the back surface of the inspection object.

According to the image inspection device 200*g* of the seventh modified example, it becomes possible to perform linear inspection region-based inspection on the images which are printed on the inspection object by the upstream-side CIS 11*b* and to perform inspection of the images (for example, a bar code image and so forth) in a two-dimensional planar inspection region which is formed on a specific position of the inspection object by the downstream side camera 11*a*. In this case, it is preferable to properly set a position of the camera 11*a* along the width direction X in advance by such manual, automatic or semi-automatic operation as described above in accordance with the position of the planar inspection area which is formed on the inspection object along the width direction X. In addition, it is also preferable to set the rectangular inspection range of the camera 11*a* to an appropriate arrangement in a vertically long arrangement and a horizontally long arrangement in advance in accordance with the shape of the image in the planar inspection region on the inspection object by operating the rotation mechanism part 54 of the camera 11*a*. Incidentally, a height of the camera 11*a* which is measured from the conveyance surface is fixed, and the sheet-shaped inspection object (the sheet paper) is sucked and fixed onto the conveyance surface of the conveyor belt 6 across the entire surface and is in the stable state. Therefore, although the possibility that the once focused camera 11*a* may become out of focus is low, focusing of the camera 11*a* may be confirmed as needed.

According to the image inspection device 200*g*, even in a case where the jam occurs on the inspection object delivery section (the hanging prevention roller 16 or the hanging prevention member 42 of the type as illustrated in FIG. 16) between the first suction conveyance unit 1 and the second suction conveyance unit 2, at least the inspection section which is installed on the downstream side of the first suction conveyance unit 1 is the camera 11*a* which is movable in the width direction X and therefore in a case where the jam occurs in the vicinity of the camera 11*a*, it is possible to secure a workspace by moving the camera 11*a* in the width direction X and then to perform manual jam clearing work more easily.

In addition, according to the image inspection device 200*g*, the inspection object that the suction conveyance unit concerned conveys as a conveyance object is the sheet-shaped paper. Accordingly, unlike a case of conveying a bag and so forth having a structure that two sheets of paper are superimposed in order to form a space in the bag, in the image inspection device 200*g*, the sheet-shaped inspection object is sucked onto the conveyance surface of the conveyor belt 6 across the entire surface and is conveyed in a state where the vertical position is fixed. Accordingly, it becomes possible to sufficiently exhibit the high reading accuracy of the CIS 11*b* which is shallower in depth of field than the camera 11*a* and for which the high arrangement accuracy is required in order to obtain the expected reading accuracy.

In addition, inspection of the inspection object on the first suction conveyance unit 1 of the image inspection device 200*g* is performed in the following order: first, linear inspection region-based inspection is performed by the CIS 11*b* on the upstream side; and then inspection of the planar inspection region is performed by the downs ream-side camera 11*a*. Therefore, in a case where behavioral abnormality of the inspection object and image abnormality are detected in line-by-line image inspection on the upstream side, a step of inspecting the planar inspection region on the downstream side is suspended by using this abnormality detection as a trigger and thereby it becomes possible to omit useless inspection of the inspection object. A sorting device or a distribution device may be installed on the downstream side of the image inspection device 200*g* for an inspection object in which abnormality is detected so as to sort or distribute the inspection object in which the abnormality is detected, then to guide the sorted or distributed inspection object to a path which is different from a path for an inspection object having no trouble and then to collect the sorted or distributed inspection object. Incidentally, in a case where the abnormality is detected in inspection by the CIS 11*b*, inspection by the camera 11*a* may be continued as it is and in regard to the inspection object in which the abnormality is detected, detection of abnormality may be left on inspection record, and image inspection may be performed again by inputting the inspection object in which the abnormality is detected on an inspection line later.

Further, in the image inspection device 200*g*, when positional displacement of the inspection object occurs in the width direction X while the inspection object is conveyed, occurrence of a trouble that the planer inspection region does not enter the inspection range of the camera 11*a* which is set in alignment with the position of the planar inspection region (for example, the QR code) to make it impossible to perform inspection is conceivable. However, according to the image inspection device 200g, the CIS 11b of the first suction conveyance unit 1 is able to detect positions of edges of the inspection object in the width direction X at both ends of the linear inspection region. Accordingly, in a case where the CIS 11b performs inspection of the linear inspection region a plurality of times and obtains a plurality of pieces of data on the positions of the edges which are located on the same sides in the width direction X, the control unit into which the plurality of pieces of data are input is able to decide whether the inspection object is displaced in the width direction X at once by comparing the plurality of pieces of data with one another and is able to calculate an amount of displacement immediately in a case where the inspection object is displaced in the width direction X. Then, the control unit controls the moving mechanism for the camera 11a which is located on the downstream side in accordance with the displacement amount and thereby it becomes possible to correct the position of the camera 11a, in the width direction X, to make a new position of the planar inspection region and the inspection range of the camera 11a match each other and thereby to make the camera 11a properly perform inspection of the planar inspection region.

Figure 20:
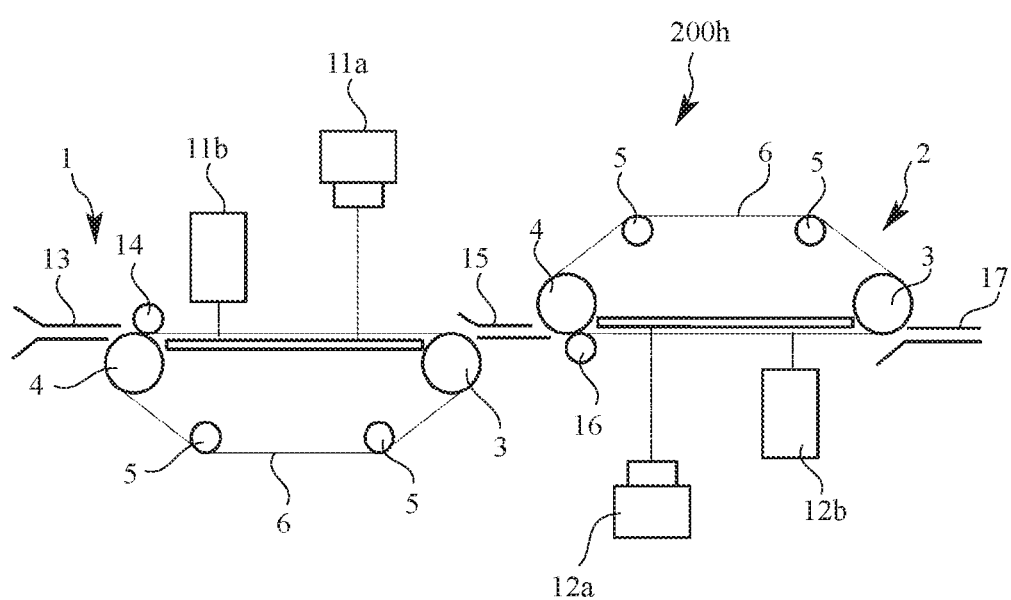
FIG. 20 is a schematic configuration diagram illustrating an eight modified example of the image inspection device according to the embodiment of the present invention.

FIG. 20 is a schematic front view illustrating an eighth modified example.

In an image inspection device 200h according to the eighth modified example, the configuration of the conveyance mechanism centering around the first suction conveyance unit 1 and the second suction conveyance unit 2 is the same as the configuration of the conveyance mechanism of the image inspection device 200 according to the embodiment. Thus, the numerals which are the same as those in FIG. 2 are assigned to the corresponding constitutional elements and description thereof is omitted by quoting the description of the embodiment. In addition, although the kind and the number of the inspection sections of the inspection sections are the same as those in the third example of the present embodiment illustrated in FIG. 15, a way of arraying the inspection sections along the inspection object conveyance direction according to the kind is different from the way illustrated in FIG. 15.

That is, as illustrated in FIG. 20, in the image inspection device 200h, although the CIS 11b and the camera 11a are arrayed in this order from the upstream side on the first suction conveyance unit 1 which is located on the upstream side of the conveyance direction as described before with reference to FIG. 19, the camera 12a and the CIS 12b are arrayed in this order from the upstream side on the second suction conveyance unit 2 which is located on the downstream side. That is, both of the two inspection sections which are arranged immediately adjacent to the upstream side and the downstream side of the hanging prevention roller (or the hanging prevention member 42 of the type as illustrated in FIG. 16) are the cameras. The configurations of the CISs 11b and 12b and the cameras 11a and 12a are as described before description of this modified example. However, as a more specific arrangement example of the inspection sections, the height of the CISs 11b and 12b which is measured from the conveyance surface of the conveyor belt 6 is set to about 24 mm, the height of the cameras 11a and 12a which is measured from the conveyance surface of the conveyor belt 6 is set to about 120 mm in view of the fact that the cameras 11a and 12a are area cameras each having a wide-angle inspection range. In addition, the cameras 11a and 12a are loaded on the sliding-type moving mechanism similarly to the cameras in the seventh modified example which is illustrated in FIG. 19. As the description of the moving mechanism, the description of the moving mechanism of the seventh modified example will be quoted.

According to the image inspection device 200h, since both of the two inspection sections which are arranged immediately adjacent to the upstream side and the downstream side of the hanging prevention roller 16 (or the hanging prevention member 42 of the type as illustrated in FIG. 16) which is the section for delivering the inspection object are the cameras 11a and 12a, in a case where the jam occurs in the vicinity of the hanging prevention roller 16 (or the hanging prevention member 42), it becomes possible to secure a large space through which the operator inserts his/her hand into the image inspection device 200h by moving the cameras 11a and 12a from the conveyance paths on both the upstream side and the downstream side of the hanging prevention roller 16 (or the hanging prevention member 42) to the back side of the image inspection device 200h, and therefore the jam clearance work becomes more easily than the jam clearance work in the image inspection device 200g (FIG. 19) according to the seventh modified example.

Incidentally, in the present embodiment and the modified examples thereof, the first suction conveyance unit 1 is arranged in such a manner that the conveyance surface is located on the upper surface side and the second suction conveyance unit is arranged in such a manner that the conveyance surface is located on the lower surface side and is arranged adjacent to the conveyance surface of the first suction conveyance unit 1 along the inspection object conveyance direction. However, there is no particular limitation on the paper conveyance direction relative to the first and second suction conveyance units 1 and 2. That is, for example, although in FIG. 2, the inspection object is illustrated to be conveyed from left to right, the inspection object may be conveyed from right to left. In addition, in FIG. 2, arrangement of the first suction conveyance unit 1 and the second suction conveyance unit 2 may be changed in such a manner that the first suction conveyance unit 1 is located on the right side and the second suction conveyance unit 2 is located on the left side. Also, in this case, the paper may be conveyed either rightward or leftward.

Incidentally, although belt suction conveyance using a fan is described as the inspection object conveyance element in the present embodiment and the modified examples thereof, electrostatic suction conveyance, bonding conveyance by bonding using roller conveyance, and other types of bonding conveyance using certain bonding elements may be used. As bonding conveyance using the roller conveyance which is one example of the bonding conveyance, for example, it is possible to convey paper by making the paper bond to a roller by a roller conveyance element in which a bonding agent having a bond strength of such an extent that the inspection object does not fall under its own weight is applied onto a roller surface, and it is also possible to use this roller conveyance member in place of the suction conveyance unit of the present embodiment. Further, as bonding conveyance using other bonding elements, it is also possible to use bonding conveyance using belt conveyance in which the inspection object is conveyed by applying the above-described bonding agent onto the conveyor belt. Incidentally, in a case of performing these types of bonding conveyance, a peeling section which peels the paper from the bonding agent on the conveyor belt or the roller may be installed. Inspection object conveyance is not limited to the belt suction conveyance using the fan just like the conveyance of the present embodiment in this way. In addition, even in a case of performing the electrostatic suction conveyance and the bonding conveyance by the first and second suction conveyance units 1 and 2, the inspection section(s) may be arranged on the downstream sides of the first and second suction conveyance units 1 and 2. This is because, for example, also in a case of performing the electrostatic suction conveyance, an electrostatic suction area becomes larger on the downstream aide than on the upstream side and suction is stabilized. In addition, also in a case of performing bonding conveyance by using the plurality of rollers in the first and second suction conveyance units 1 and 2, suction is stabilized and conveyance is secured more in a state where the inspection object is conveyed by being bonded using two or more roller on the downstream side than in a state where the inspection object is conveyed by being bonded using one roller on the upstream side.

Incidentally, although there are cases where the drawings which are appended to the present specification are schematically expressed in a state where scales, an aspect dimension ratio, shapes and so forth are appropriately changed from real ones for the convenience in view of illustration and comprehensiveness, these are merely examples and do not limit interpretation of the present invention. Accordingly, the present invention is not limited by the embodiment and the modified examples thereof which are described using the appended drawings, and all the other feasible aspects, embodiments, operation technologies and so forth which would be conceived of by a person skilled in the art on the basis of the present embodiment and the modified examples thereof are included in the scope of the present invention.

<<Sheet Feeders of Respective Aspects in Present Embodiment and Modified Examples Thereof and Effects Thereof>>

The suction conveyance device according to the first aspect includes:

the first suction conveyance unit 1 which is arranged in such a manner that the conveyance surface on which the sheet-shaped conveyance object is conveyed is located on the upper surface side;

the second suction conveyance unit 2 which is arranged adjacent to the conveyance surface of the first suction conveyance unit 1 along the conveyance object conveyance direction in such a manner that the conveyance surface on which the sheet-shaped conveyance object is conveyed is located on the lower surface side; and the hanging prevention member 42 which is installed between the first suction conveyance unit 1 and the second suction conveyance unit 2 and delivers the conveyance object from the upstream side to the downstream side of the conveyance direction in such a manner that the top edge of the conveyance object does not hang down.

According to the suction conveyance device according to the first aspect, the conveyance object is stably conveyed in a state of being sucked and held on the upper surface side of the first suction conveyance unit 1. The conveyance object is delivered from the upstream side to the downstream side by the hanging prevention member 16, 42 between the downstream side end of the first suction conveyance unit 1 and the upstream side end of the second suction conveyance unit 2 and the top edge of the conveyance object does not hang down.

Accordingly, the top edge of the conveyance object is surely sucked and held on the conveyance surface of the second suction conveyance unit 2 and is stably conveyed toward the downstream as it is. The conveyance object is continuously conveyed from the first suction conveyance unit 1 to the second suction conveyance unit 2 stably in this way.

The image inspection device 200, 200*a* to 200*f* according to the second aspect each includes the first suction conveyance unit 1 which is arranged in such a manner that the conveyance surface on which the sheet-shaped inspection object is sucked and conveyed is located on the upper surface side, the second suction conveyance unit 2 which is arranged adjacent to the conveyance surface of the first suction conveyance unit 1 along the inspection object conveyance direction in such a manner that the conveyance surface on which the sheet-shaped inspection object is sucked and conveyed is located on the lower surface side the first inspection section 11 which inspects the image on the front surface of the inspection object which is conveyed by the first suction conveyance unit 1, and the second inspection section 12 which inspects the image on the back surface of the inspection object which is conveyed by the second suction conveyance unit 2.

The hanging prevention member 16, 42 which delivers the inspection object from the upstream side to the downstream side of the conveyance direction in such a manner that the top edge of the inspection object does not hang down is installed between the first suction conveyance unit 1 and the second suction conveyance unit 2.

Incidentally, the first suction conveyance unit 1 may be a conveyance path which is configured by a roller and does not conduct suction and bonding. In addition, the second suction conveyance unit 2 may also be arranged in such a manner that the inspection object conveyance surface is located on the upper surface side similarly to the first suction conveyance unit 1.

According to the image inspection devices 200, 200*a* to 200*f* according to the second aspect, the inspection object is stably conveyed by being sucked and held on the upper surface side of the first suction conveyance unit 1. The inspection object is delivered from the upstream side to the downstream side by the hanging prevention member 16, 42 between the downstream-side end of the first suction conveyance unit 1 and the upstream-side end of the second suction conveyance unit 2 and therefore the top edge of the inspection object does not hang down. Accordingly, the top edge of the inspection object is surely sucked and held on the conveyance surface of the second suction conveyance unit 2 and is stably conveyed toward the downstream as it is. Since the inspection object is continuously conveyed from the first suction conveyance unit 1 to the second suction conveyance unit 2 stably in this way, the expected accuracy is maintained in the inspection by the first inspection section 11 and the second inspection section 12.

In the image inspection device 200, 200*a* to 200*c*, 200*e* and 200*f* according to a third aspect, the hanging prevention member is the hanging prevention roller having the roller portion which is divided into the pectinate shape in the axial direction which is orthogonal to the inspection object conveyance direction, in the image inspection device according to the second aspect.

According to the image inspection devices 200, 200*a* to 200*c*, 200*e* and 200*f* according to the third aspect, when the inspection object is sent from the first suction conveyance unit 1 into the second suction conveyance unit 2, the top edge of the inspection object abuts on and runs on the hanging prevention roller 16 before the top edge of the inspection object hangs down under its own weight or due to downward curling and so forth, and the top edge is sandwiched between the hanging prevention roller 16 and the second suction conveyance unit 2 and then stable suction conveyance is stared without delay. In addition, since the hanging prevention roller 16 sandwiches the inspection object between the pectinate roller portion and the second suction conveyance unit 2, in a case where the wavy deformation (cackling) is observed on the inspection object, the cockling of the inspection object is corrected in shape in the direction that the crest of cockling is leveled and the depth of the trough is reduced, and consequently the deformation is changed to the wavy form which is smaller in cycle, the cockling is corrected and thereby the effect of preventing erroneous detection of the images by the inspection sections is obtained.

The image inspection devices 200, 200a to 200f according to a fourth aspect each include the first support section 21 to which the first inspection section 11 is attached and which is positioned relative to the first suction conveyance unit 1, the first conveyance direction adjustment elements (35 to 40) which are installed on the first support section 21 and adjust the direction that the inspection object is conveyed by the first suction conveyance unit 1 relative to the first inspection section 11, the second support section 22 to which the second inspection section 12 is attached and which is positioned relative to the second suction conveyance unit 2, and the second conveyance direction adjustment elements (35 to 40) which are installed on the second support section 22 and adjust the direction that the inspection object is conveyed by the second suction conveyance unit 2 relative to the second inspection section 12, in the image inspection device according to the second aspect.

According to the image inspection devices 200, 200a to 200f according to the fourth aspect, it is possible to adjust the inspection object conveyance direction relative to the first inspection section 11 by moving the first suction conveyance unit 1 relative to the first support section 21 by the first conveyance direction adjustment elements (35 to 40). In addition, it is possible to adjust the inspection object conveyance direction relative to the second inspection section 12 by moving the second suction conveyance unit 2 relative to the second support section 22 by the second conveyance direction adjustment elements (35 to 40). Accordingly, in a case where a trouble occurs in the positional relation between each of the first inspection section 11 and the second inspection section 12 and the inspection object conveyance direction due to some cause, it is possible to prevent occurrence of erroneous detection of the images on the inspection object by the first inspection section 11 and the second inspection section 12 by correcting the positional relation concerned by operating the first conveyance direction adjustment elements (35 to 40) and the second conveyance direction adjustment elements (35 to 40).

In the image inspection device 200e according to a fifth aspect, the skew correction roller 43 which corrects skewing of the inspection object which is conveyed from the preceding stage is installed adjacent to the upstream-side end of the suction conveyance unit which is located on the upstream side of the inspection object conveyance direction in the first suction conveyance unit 1 and the second suction conveyance unit 2, in the image inspection device according to the second aspect.

According to the image inspection device 200e according to the fifth aspect, even in a case where the inspection object which is sent from the upstream skews, it is possible to correct the direction of the inspection object by the skew correction roller 43 and to send the inspection object in the proper posture to the first inspection section 11.

In the image inspection device 200g according to a sixth aspect, at least one of the first inspection section which is arranged relatively on the downstream side of the first suction conveyance unit and the second inspection section which is arranged relatively on the upstream side of the second suction conveyance unit is movable in the width direction of the inspection object which is parallel with the conveyance surface, in the image inspection device according to the second aspect.

According to the image inspection device 200g according to the sixth aspect, even in a case where the inspection object jam occurs between the first suction conveyance unit 1 and the second suction conveyance unit 2, since at least one of the first inspection section which is arranged on the downstream side of the first suction conveyance unit 1 and the second inspection section which is arranged on the upstream side of the second suction conveyance unit 2 is movable in the width direction of the inspection object, in a case where the jam occurs in the vicinity of the inspection section concerned, it becomes possible to perform manual jam clearance work more easily by moving the inspection section concerned in the width direction of the inspection object.

DESCRIPTION OF REFERENCE SIGNS

1 . . . first suction conveyance unit as a first conveyance unit
2 . . . second suction conveyance unit as a second conveyance unit
11 . . . first inspection section second inspection section
11a, 12a . . . one inspection section (camera) for which a relatively low arrangement accuracy is required in the inspection sections of the suction conveyance unit
11b, 12b . . . the other inspection section (CIS) for which a relatively high arrangement accuracy is required in the inspection sections of the suction conveyance unit
16 . . . hanging prevention roller as a hanging prevention member
21 . . . first support section
22 . . . second support section
35 . . . fixing pin which configures a conveyance direction adjustment element of the suction conveyance unit
36 . . . positioning hole which configures the conveyance direction adjustment element of the suction conveyance unit
37 . . . movable pin which configures the conveyance direction adjustment element of the suction conveyance unit
38 . . . operation member which configures the conveyance direction adjustment element of the suction conveyance unit
39 . . . slot which configures the conveyance direction adjustment element of the suction conveyance unit
40 . . . operation handle which configures the conveyance direction adjustment element of the suction conveyance unit
42 . . . hanging prevention member
43 . . . skew correction roller
50 . . . guide rail which configures a camera moving mechanism
51 . . . moving body which configures the camera moving mechanism
52 . . . stationary plate which configures the camera moving mechanism
54 . . . rotating mechanism section which configures the camera moving mechanism
55 . . . cable carrier which configures the camera moving mechanism
200, 200a to 200g . . . image inspection device
A, B, C . . . fulcrum which rotatably supports the support section on a frame of the image inspection device X ... inspection object width direction
Y ... inspection object conveyance direction
Z ... lens portion rotation direction by the rotating mechanism section

The invention claimed is:

1. A conveyance device comprising:
a first conveyance unit having a single movable conveyance surface, driven by a drive roller, conveying a flexible sheet-shaped conveyance object by contacting only one side thereof, wherein the single movable conveyance surface is located on an upper side of the first conveyance unit;
a second conveyance unit which is arranged apart from the first conveyance unit along a conveyance object conveyance direction, the second conveyance unit having a single movable conveyance surface, driven by a drive roller, conveying the flexible sheet-shaped conveyance object by contacting only one side thereof, wherein the single movable conveyance surface of the second conveyance unit is located on a lower side of the second conveyance unit, wherein the top edge of the flexible sheet-shaped conveyance object is configured to hang down when located in a gap between the first and second conveyance units during conveyance between the first and second conveyance units; and
a hanging prevention member having a guide surface which is installed between the first conveyance unit and the second conveyance unit and delivers the flexible sheet-shaped conveyance object from an upstream side to a downstream side of the conveyance direction in such a manner that the top edge of the flexible sheet-shaped conveyance object does not hang down when located in the gap between the first and second conveyance units during conveyance between the first and second conveyance units,
wherein the first conveyance unit is upstream of the second conveyance unit.

2. The conveyance device according to claim 1, wherein the first and second conveyance units are suction conveyance units holding the sheet-shaped conveyance object to the first and second movable conveyance surfaces, respectively, by suction.

3. The conveyance device according to claim 2,
wherein the single movable conveyance surface of the first conveyance unit and the single movable conveyance surface of the second conveyance unit each include a plurality of through holes, and
the device further comprises at least one fan positioned to suction air
through the plurality of through holes of the single movable conveyance surface of the first conveyance unit, and
through the plurality of through holes of the single movable conveyance surface of the second conveyance unit,
to hold the conveyance object onto the single movable conveyance surface of the first conveyance unit and the single movable conveyance surface of the second conveyance unit.

4. The conveyance device according to claim 3,
wherein the first and second conveyance units each comprise a conveyor belt, one surface of which comprises the single movable conveyance surface,
wherein the conveyor belts of the first and second conveyance units each include a contact surface opposite from the single movable conveyance surface,
wherein the device further comprises
an intermediate plate of the first conveyance unit having a first surface in contact with the contact surface of the conveyor belt of the first conveyance unit, and
an intermediate plate of the second conveyance unit having a first surface in contact with the contact surface of the conveyor belt of the second conveyance unit,
wherein the intermediate plates of the first and second conveyance units include a plurality of through holes,
wherein the at least one fan is positioned to suction air through the through holes of the conveyor belts and the intermediate plates of the first and second conveyance units to hold the conveyance object onto the single movable conveyance surface of the first conveyance unit and the single movable conveyance surface of the second conveyance unit.

5. The conveyance device according to claim 4,
wherein the intermediate plates also have a second surface opposite from the first surface,
wherein the device further comprises
a platen of the first conveyance unit having a first surface in contact with the second surface of the intermediate plate of the first conveyance unit, and
a platen of the second conveyance unit having a first surface in contact with the second surface of the intermediate plate of the second conveyance unit,
wherein the platens of the first and second conveyance units include a plurality of through holes,
wherein the at least one fan is positioned to suction air through the through holes of the conveyor belts, the intermediate plates, and the platens of the first and second conveyance units to hold the conveyance object onto the single movable conveyance surface of the first conveyance unit and the single movable conveyance surface of the second conveyance unit.

6. The conveyance device according to claim 5,
wherein the platens also have a second surface opposite from the first surface thereof,
wherein the at least one fan comprises a first fan and a second fan,
wherein the device further comprises
a chamber of the first conveyance unit attached to the second surface of the platen of the first conveyance unit and including the first fan configured to maintain a negative pressure in the chamber of the first conveyance unit, and
a chamber of the second conveyance unit attached to the second surface of the platen of the second conveyance unit and including the second fan configured to maintain a negative pressure in the chamber of the second conveyance unit, and
wherein when the first fan is driven, air is suctioned into the chamber of the first conveyance unit from the single movable conveyance surface of the first conveyance unit via the through holes therein, and via the through holes in the intermediate plate and the platen of the first conveyance unit, and
when the second fan is driven, air is suctioned into the chamber of the second conveyance unit from the single movable conveyance surface of the second conveyance unit via the through holes therein, and via the through holes in the intermediate plate and the platen of the second conveyance unit.

7. An image inspection device comprising:
a first conveyance unit having a single movable conveyance surface, driven by a drive roller, conveying a flexible sheet-shaped inspection object by contacting only one side thereof, wherein the single movable conveyance surface is located on an upper side of the first conveyance unit;

a second conveyance unit which is arranged apart from the first conveyance unit along an inspection object conveyance direction, the second conveyance unit having a single movable conveyance surface, driven by a drive roller, conveying the flexible sheet-shaped inspection object by contacting only one side thereof, wherein the single movable conveyance surface of the second conveyance unit is located on a lower side of the second conveyance unit, wherein the top edge of the flexible sheet-shaped inspection object is configured to hang down when located in a gap between the first and second conveyance units during conveyance between the first and second conveyance units;

a first inspection section including a first image sensor which inspects an image on a front surface of the flexible sheet-shaped inspection object which is conveyed by the first conveyance unit; and a second inspection section including a second image sensor which inspects an image on a back surface of the flexible sheet-shaped inspection object which is conveyed by the second conveyance unit, wherein a hanging prevention member having a guide surface which delivers the flexible sheet-shaped inspection object from the upstream side to the downstream side of the conveyance direction in such a manner that the top edge of the flexible sheet-shaped inspection object does not hang down when located in the gap between the first and second conveyance units during conveyance between the first and second conveyance units, the hanging prevention member being installed between the first conveyance unit and the second conveyance unit, wherein the first conveyance unit is upstream of the second conveyance unit.

8. The image inspection device according to claim 7, wherein the hanging prevention member is a hanging prevention roller which has a roller portion which is divided into a pectinate form in an axial direction which is orthogonal to the inspection object conveyance direction.

9. The image inspection device according to claim 7, wherein a skew correction roller, which corrects skewing of the inspection object which is conveyed from a preceding stage, is installed adjacent to an upstream-side end of the first conveyance unit and the second conveyance unit which are arranged in the inspection object conveyance direction.

10. The image inspection device according to claim 7, wherein the first and second conveyance units are suction conveyance units holding the sheet-shaped inspection object to the first and second movable conveyance surfaces, respectively, by suction.

11. The image inspection device according to claim 10, wherein the single movable conveyance surface of the first conveyance unit and the single movable conveyance surface of the second conveyance unit each include a plurality of through holes, and the device further comprises at least one fan positioned to suction air
through the plurality of through holes of the single movable conveyance surface of the first conveyance unit, and
through the plurality of through holes of the single movable conveyance surface of the second conveyance unit,
to hold the conveyance object onto the single movable conveyance surface of the first conveyance unit and the single movable conveyance surface of the second conveyance unit.

12. The image inspection device according to claim 11,
wherein the first and second conveyance units each comprise a conveyor belt, one surface of which comprises the single movable conveyance surface,
wherein the conveyor belts of the first and second conveyance units each include a contact surface opposite from the single movable conveyance surface,
wherein the device further comprises
an intermediate plate of the first conveyance unit having a first surface in contact with the contact surface of the conveyor belt of the first conveyance unit, and
an intermediate plate of the second conveyance unit having a first surface in contact with the contact surface of the conveyor belt of the second conveyance unit,
wherein the intermediate plates of the first and second conveyance units include a plurality of through holes,
wherein the at least one fan is positioned to suction air through the through holes of the conveyor belts and the intermediate plates of the first and second conveyance units to hold the conveyance object onto the single movable conveyance surface of the first conveyance unit and the single movable conveyance surface of the second conveyance unit.

13. The image inspection device according to claim 12,
wherein the intermediate plates also have a second surface opposite from the first surface,
wherein the device further comprises
a platen of the first conveyance unit having a first surface in contact with the second surface of the intermediate plate of the first conveyance unit, and
a platen of the second conveyance unit having a first surface in contact with the second surface of the intermediate plate of the second conveyance unit,
wherein the platens of the first and second conveyance units include a plurality of through holes,
wherein the at least one fan is positioned to suction air through the through holes of the conveyor belts, the intermediate plates, and the platens of the first and second conveyance units to hold the conveyance object onto the single movable conveyance surface of the first conveyance unit and the single movable conveyance surface of the second conveyance unit.

14. The image inspection device according to claim 13,
wherein the platens also have a second surface opposite from the first surface thereof,
wherein the at least one fan comprises a first fan and a second fan,
wherein the device further comprises
a chamber of the first conveyance unit attached to the second surface of the platen of the first conveyance unit and including the first fan configured to maintain a negative pressure in the chamber of the first conveyance unit, and
a chamber of the second conveyance unit attached to the second surface of the platen of the second conveyance unit and including the second fan configured to maintain a negative pressure in the chamber of the second conveyance unit, and
wherein when the first fan is driven, air is suctioned into the chamber of the first conveyance unit from the single movable conveyance surface of the first conveyance unit via the through holes therein, and via the through holes in the intermediate plate and the platen of the first conveyance unit, and when the second fan is driven, air is suctioned into the chamber of the second conveyance unit from the single movable conveyance surface of the second conveyance unit via the through holes therein, and via the through holes in the intermediate plate and the platen of the second conveyance unit.

15. An image inspection device comprising:

a first conveyance unit having a first movable conveyance surface, driven by a drive roller, on which a sheet-shaped inspection object is conveyed, wherein the first movable conveyance surface is located on an upper side of the first conveyance unit;

a second conveyance unit which is arranged apart from the first conveyance unit along an inspection object conveyance direction, the second conveyance unit having a second movable conveyance surface, driven by a drive roller, on which the sheet-shaped inspection object is conveyed, wherein the second movable conveyance surface is located on a lower side of the second conveyance unit;

a first inspection section including a first image sensor which inspects an image on a front surface of the inspection object which is conveyed by the first conveyance unit;

a second inspection section including a second image sensor which inspects an image on a back surface of the inspection object which is conveyed by the second conveyance unit;

a first support section having a first elongate support surface to which the first inspection section is attached and which is positioned relative to the first conveyance unit;

a first conveyance direction adjustment element which is installed on the first support section and adjusts the direction that the inspection object is conveyed by the first conveyance unit relative to the first inspection section;

a second support section having a second elongate support surface to which the second inspection section is attached and which is positioned relative to the second conveyance unit; and a second conveyance direction adjustment element which is installed on the second support section and adjusts the direction that the inspection object is conveyed by the second conveyance unit relative to the second inspection section, wherein a hanging prevention member having a guide surface which delivers the inspection object from the upstream side to the downstream side of the conveyance direction in such a manner that a top edge of the inspection object does not hang down is installed between the first conveyance unit and the second conveyance unit.

16. An image inspection device comprising:

a first conveyance unit having a first movable conveyance surface, driven by a drive roller, on which a sheet-shaped inspection object is conveyed, wherein the first movable conveyance surface is located on an upper side of the first conveyance unit;

a second conveyance unit which is arranged apart from the first conveyance unit along an inspection object conveyance direction, the second conveyance unit having a second movable conveyance surface, driven by a drive roller, on which the sheet-shaped inspection object is conveyed, wherein the second movable conveyance surface is located on a lower surface side of the second conveyance unit;

a first inspection section including a first image sensor which inspects an image on a front surface of the inspection object which is conveyed by the first conveyance unit; and a second inspection section including a second image sensor which inspects an image on a back surface of the inspection object which is conveyed by the second conveyance unit, wherein a hanging prevention member having a guide surface which delivers the inspection object from the upstream side to the downstream side of the conveyance direction in such a manner that a top edge of the inspection object does not hang down is installed between the first conveyance unit and the second conveyance unit, and wherein at least one of the first inspection section which is arranged relatively on the downstream side of the first conveyance unit and the second inspection section which is arranged relatively on the upstream side of the second conveyance unit is movable in a width direction of the inspection object which is parallel with the conveyance surface.

* * * * *